United States Patent
Ghosh et al.

(10) Patent No.: US 8,972,949 B2
(45) Date of Patent: Mar. 3, 2015

(54) RULE-BASED METHOD FOR PROVING UNSATISFIABLE CONDITIONS IN A MIXED NUMERIC AND STRING SOLVER

(75) Inventors: Indradeep Ghosh, Cupertino, CA (US); Guodong Li, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 55 days.

(21) Appl. No.: 13/482,598

(22) Filed: May 29, 2012

(65) Prior Publication Data

US 2013/0326485 A1    Dec. 5, 2013

(51) Int. Cl.
*G06F 9/44*    (2006.01)

(52) U.S. Cl.
USPC ........................................... 717/126; 717/131

(58) Field of Classification Search
None
See application file for complete search history.

(56) References Cited

U.S. PATENT DOCUMENTS 8,543,986 B2 *   9/2013   Murthy et al. ................ 717/126

* cited by examiner

*Primary Examiner* — Don Wong
*Assistant Examiner* — Deric Ortiz
(74) *Attorney, Agent, or Firm* — Baker Botts L.L.P.

(57) ABSTRACT

A method includes, by computing devices, analyzing numeric and string constraints associated with a software module that includes numeric and string variables and operations applying to specific variables for numeric or string results. The numeric constraints apply to specific numeric variables. The string constraints apply to specific string variables. The method further includes determining an over-approximated constraint from the numeric constraints or operations, representing the over-approximated constraint and string constraints with finite state machines, representing the numeric constraints with an equation, determining whether a solution does not exist for the combination of the variables that satisfies the over-approximated constraint, the numeric constraints, and the string constraints using operations, and terminating attempts to solve for the variables based on the determination whether the solution does not exist. The over-approximated constraint includes a superset of the numeric constraints or operations and applies to specific string variables.

21 Claims, 7 Drawing Sheets

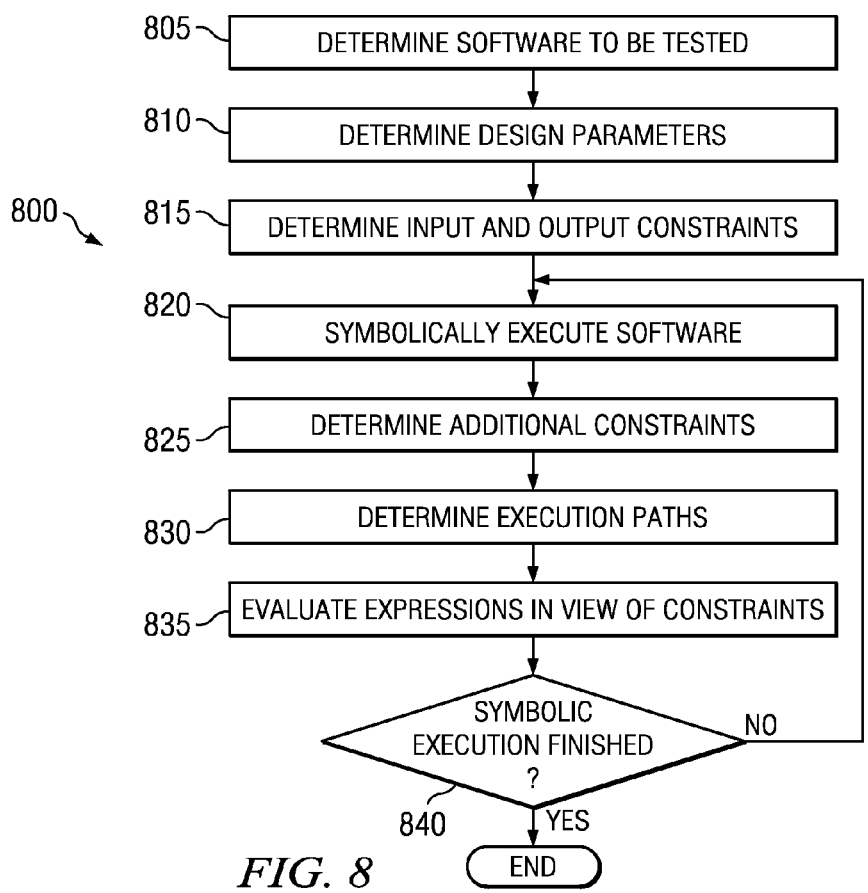

| NUMERIC CONSTRAINT | ADDITIONAL STRING RULE |
|---|---|
| 702 — VOF (a) > 0<br>ex: a > 0, a > 1, a > 2, ... | a. charAt (0) != '-' |
| 704 — VOF (a) < 0<br>ex: a < 0, a < -1, a < -2, ... | a. charAt (0) = "-" |
| 706 — Length (a trim ( )) = 0 | length (a) = undefined |
| 708 — VOF (a) > p; p int; p > 0<br>ex: a > 1, a > 2, a > 3 | length (a) > $\log_{10}$ (p) &<br>a. charAt (0) != "-" |
| 710 — VOF (a) < p; p int; p > 0<br>ex: a < 1, a < 2, a < 3 | length (a) <= $\log_{10}$ (p) &<br>a. charAt (0) != '-'<br>OR<br>a. charAt (0) = "-" |

- 805 — DETERMINE SOFTWARE TO BE TESTED
- 810 — DETERMINE DESIGN PARAMETERS
- 815 — DETERMINE INPUT AND OUTPUT CONSTRAINTS
- 820 — SYMBOLICALLY EXECUTE SOFTWARE
- 825 — DETERMINE ADDITIONAL CONSTRAINTS
- 830 — DETERMINE EXECUTION PATHS
- 835 — EVALUATE EXPRESSIONS IN VIEW OF CONSTRAINTS
- 840 — SYMBOLIC EXECUTION FINISHED? NO → (back to 820) / YES → END

RULE-BASED METHOD FOR PROVING UNSATISFIABLE CONDITIONS IN A MIXED NUMERIC AND STRING SOLVER

TECHNICAL FIELD

The present invention generally relates to software verification and, more particularly, to a rule-based method for proving unsatisfiable conditions in a mixed numeric and string solver.

BACKGROUND

A software application may include any number of modules (e.g., classes, functions, procedures, subroutines, or code blocks), and each module may be tested or validated individually. A software module may be tested or validated manually or automatically. In the former case, a person (e.g., a software testing engineer) may manually design test cases for the software module based on the design specification of the module, execute the module under the test cases, and check for module behavior or output that does not agree with the test cases. In the later case, a software-testing tool, implemented as computer software or hardware, may automatically generate test cases for a software module under test, execute the module under test while simulating the test cases, and check for module behavior or output that does not agree with the test cases. The sheer complexity of modern software often renders manual generation or design of test cases inadequate for completely testing the software.

SUMMARY

In one embodiment, a method includes, by one or more computing devices, analyzing one or more first numeric constraints and one or more first string constraints associated with a software module. The software module includes one or more numeric variables, one or more string variables, one or more first operations that apply to specific ones of the numeric variables and produce numeric or string results, and one or more second operations that apply to specific ones of the string variables and produce numeric or string results. The first numeric constraints apply to specific ones of the numeric variables. The first string constraints apply to specific ones of the string variables. The method further includes determining an over-approximated constraint from one or more of the first numeric constraints or first operations, representing the over-approximated constraint with a finite state machine, representing each one of the first numeric constraints with an equation, representing each one of the first string constraints with a finite state machine, determining whether a solution does not exist for the numeric and string variables that satisfies the over-approximated constraint, the first numeric constraints, and the first string constraints using the first and second operations, and terminating attempts to solve for the numeric and string variables based on the determination whether the solution does not exist. The over-approximated constraint includes a superset of the one or more of the first numeric constraints or first operations and applies to specific ones of the string variables.

In another embodiment, a system includes a computer readable medium having computer-executable instructions and one or more processors coupled to the computer readable medium. The processors are operable to read and execute the instructions. The processors are operable when executing the instructions to analyze one or more first numeric constraints and one or more first string constraints associated with a software module. The software module includes one or more numeric variables, one or more string variables, one or more first operations that apply to specific ones of the numeric variables and produce numeric or string results, and one or more second operations that apply to specific ones of the string variables and produce numeric or string results. The first numeric constraints apply to specific ones of the numeric variables. The first string constraints apply to specific ones of the string variables. The processors are further operable to determine an over-approximated constraint from one or more of the first numeric constraints or first operations, represent the over-approximated constraint with a finite state machine, represent each one of the first numeric constraints with an equation, represent each one of the first string constraints with a finite state machine, determine whether a solution does not exist for the numeric and string variables that satisfies the over-approximated constraint, the first numeric constraints, and the first string constraints using the first and second operations, and terminate attempts to solve for the numeric and string variables based on the determination whether the solution does not exist. The over-approximated constraint includes a superset of the one or more of the first numeric constraints or first operations and applies to specific ones of the string variables.

In yet another embodiment, an article of manufacture includes a computer readable medium computer-executable instructions carried on the computer readable medium. The instructions are readable by a processor. The instructions, when read and executed, cause the processor to analyze one or more first numeric constraints and one or more first string constraints associated with a software module. The software module includes one or more numeric variables, one or more string variables, one or more first operations that apply to specific ones of the numeric variables and produce numeric or string results, and one or more second operations that apply to specific ones of the string variables and produce numeric or string results. The first numeric constraints apply to specific ones of the numeric variables. The first string constraints apply to specific ones of the string variables. The processor is further operable to determine an over-approximated constraint from one or more of the first numeric constraints or first operations, represent the over-approximated constraint with a finite state machine, represent each one of the first numeric constraints with an equation, represent each one of the first string constraints with a finite state machine, determine whether a solution does not exist for the numeric and string variables that satisfies the over-approximated constraint, the first numeric constraints, and the first string constraints using the first and second operations, and terminate attempts to solve for the numeric and string variables based on the determination whether the solution does not exist. The over-approximated constraint includes a superset of the one or more of the first numeric constraints or first operations and applies to specific ones of the string variables.

BRIEF DESCRIPTION OF THE DRAWINGS

For a more complete understanding of the present invention and its features and advantages, reference is now made to the following description, taken in conjunction with the accompanying drawings, in which:

FIG. 7 is an illustration of example embodiments of a rule library;

FIG. 8 is an illustration of an example embodiment of a method for proving unsatisfiable formulas in an expression from software under test.

DETAILED DESCRIPTION

Figure 1:
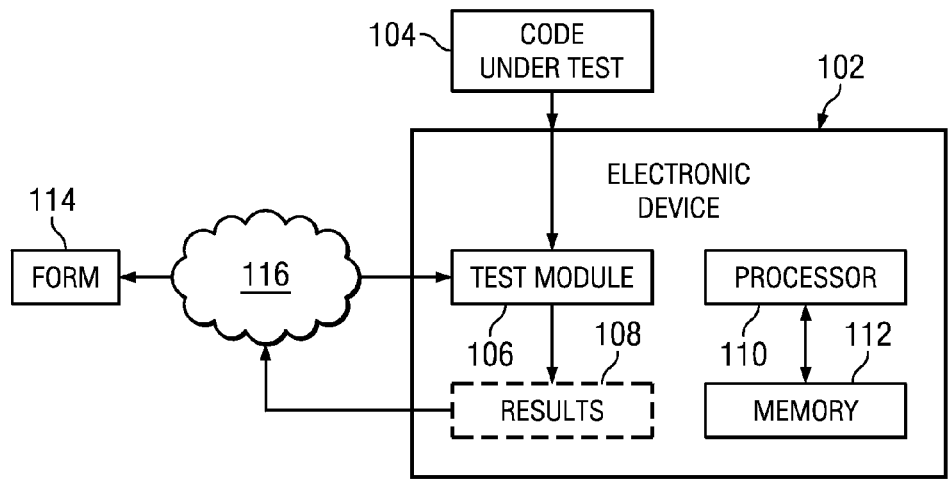
FIG. 1 is an example embodiment of a system for conducting a rule-based method for proving that formulas, representing the operation of electronic data under test, including mixed number and string types are satisfiable or unsatisfiable.

FIG. 1 is an example embodiment of a system 100 for conducting a rule-based method for proving that formulas, representing the operation of electronic data under test, including mixed number and string types are satisfiable or unsatisfiable. The formulas including mixed number and string types may be based on code, software, or other electronic data to be verified or tested. By proving that the formulas based on the electronic data are satisfiable or unsatisfiable, system 100 may be configured to validate the data or determine that the data has errors or bugs. In one embodiment, system 100 may include a mixed number and string solver to conduct such a rule-based method. System 100 may include a test module 106 configured to conduct the rule-based method of proving formulas. Test module 106 may include a mixed number and string solver. Formulas based upon, for example, the designed operation or structure specified in code under test 104 or form 114, may be determined and evaluated by test module 106. Test module 106 may be configured to produce results 108 from testing code under test 104 or form 114. Results 108 may indicate whether portions of code under test 104 or form 114 have been determined to be valid or whether they contain bugs or other errors.

In one embodiment, test module 106 may be configured to determine whether a formula based upon code under test 104 or form 114 is unsatisfiable and thus contains errors. In another embodiment, test module 106 may be further configured to determine whether a formula based upon code under test 104 or form 114 is satisfiable and thus is validated. In order to evaluate code under test 104 or form 114, test module 106 may be configured to symbolically execute code under test 104 or form 114. During such symbolic execution, test module 106 may be configured to determine possible execution paths of code under test 104 or form 114. The possible execution paths may contain or yield sets of constraints involving numeric values and variables as well as string values and variables. Test module 106 may be configured to attempt to solve the numeric constraints and string constraints. If such constraints can be solved in context with one another, the execution path may be determined to be satisfiable. If such constraints are impossible to solve in context with one another, the execution path may be determined to be unsatisfiable. In one embodiment, such constraints may not be solved after a certain depth or length of execution. In such an embodiment, it may be unknown whether the constraints are satisfiable or unsatisfiable. Based on such determinations, the portion of code under test 104 or form 114 corresponding to the execution path may be identified as validated, containing errors, or unknown as to satisfiability.

In one embodiment, test module 106 may be configured to recognize special constraint patterns or solutions within the formulas generated from code under test 104 or form 114. In a further embodiment, such constraint patterns may exist in association with numeric or string domains. Based on such recognition, test module 106 may be configured to create an additional constraint in a different domain than the domain in which the pattern was recognized. For example, if a string criteria pattern is recognized, test module 106 may be configured to add a numeric constraint to the numeric domain of constraints. In another example, if a numeric criteria pattern is recognized, test module 106 may be configured to add a string constraint to the string domain of constraints. In one embodiment, the new constraint may include an over-approximation of the recognized criteria. In another embodiment, the new constraint may include a generalization of the recognized criteria. In yet another embodiment, the new constraint may be derived from the recognized criteria. In the targeted domain, the new constraint may be evaluated in the context of other constraints and formulas already existing within the domain. If the new set of constraints and formulas, including the new constraint, cannot be solved, then test module 106 may immediately determine that the formula is unsatisfiable. If it cannot be determined whether the new set of constraints and formulas is unsolvable, then test module 106 may proceed with its normal process of evaluating whether the set is solvable.

A new constraint including an over-approximation or generalization of a recognized criterion may include criteria that include the recognized criteria along with other possible values. The new constraint may be a superset of the recognized criteria. Furthermore, the new constraint may be defined in the same domain (i.e., numeric or string) as the recognized criteria. For example, if recognized criteria include requiring that a variable x must be equal to five, then an over-approximation or generalization of the criteria may be that variable x must be greater than zero. The recognized criteria may require intensive formula solving to determine particular solutions solving for the specific recognized criteria. Determining and subsequently using an over-approximation or generalization of the recognized criteria may enable more efficient formula-solving, as the over-approximation or generalization may limit the processing necessary to be evaluated or solved to determine whether a given set of formulas and constraints is unsatisfiable. In some cases, the new constraint may not necessarily further enable test module 106 to determine if a formula is satisfiable. Using the example above, given a criteria that variable x must be equal to five, the new constraint that variable x be greater than zero would not assist test module 106 in determining that the formula is satisfiable. When generating possible solutions, test module 106 would waste time evaluating solutions wherein variable x is assigned the values of one, two, three, or four. However, when solving for unsatisfiability, test module 106 may benefit from having a more expansive set of constraints because test module 106 may be searching for violations of the formulas and constraints. Thus, the new constraint, including the over-approximation or generalization, may further enable the efficient evaluation by test module 106.

By immediately determining whether the formula is unsatisfiable given the new constraint, test module 106 may save significant processing resources that would otherwise be used in processing constraints within the domain determining whether a solution existed. Without such a determination, test module 106 may have otherwise continued processing constraints without reaching a determination before operational or execution limits are reached.

Test module 106 may be implemented by any suitable mechanism, such as a program, software, function, library, software-as-service, analog or digital circuitry, or any combination thereof. Test module 106 may be resident on electronic device 102. Electronic device 102 may include a processor 110 coupled to a memory 112. Test module 106 may be embodied in logic or instructions resident in memory 112 for execution by processor 110. Processor 110 may include, for example, a microprocessor, microcontroller, digital signal processor (DSP), application specific integrated circuit (ASIC), or any other digital or analog circuitry configured to interpret and/or execute program instructions and/or process data. Processor 110 may interpret and/or execute program instructions and/or process data stored in memory 112. Memory 112 may comprise any system, device, or apparatus configured to retain program instructions and/or data for a period of time (e.g., computer-readable media).

Code under test 104 or form 114 may include, for example, software, software code, libraries, applications, scripts, or other logic or instructions for execution upon an electronic device. In one embodiment, code under test 104 may include a complete instance of such software. In another embodiment, code under test 104 may include a portion of such software. Code under test 104 may be provided to electronic device 102 over a network. Form 114 may include fields for information to be completed by a user, such as a human or computer user. In one embodiment, form 114 may be provided over network 116 to electronic device 102. In another embodiment, form 114 may implement, for example, a portion of a webpage, active document, or web content.

Code under test 104 or form 114 may be portions of a software application organized into a number of software modules, and each such software module may include code that perform specific functionalities. Such code may include code under test 104 or form 114. A software module may have any number of input or output variables. When the software module is invoked, actual input values may be passed to the software module (e.g., by the code that invokes the software module) as the values assigned to the input variables of the software module. The code of the software module may be executed in connection with the actual input values. Eventually, actual output values for the output variables of the software module may be determined and returned by the software module, at which point the software module completes its execution. Moreover, the actual output values determined by the code of the software module may depend on the actual input values passed to the software module upon its invocation. In addition, the software module may have any number of local variables, also referred to as intermediate variables, whose values may also depend, directly or indirectly, on the values of the input variables. A local variable may have a local scope in which the local variable only exists and is only accessible from within the context of the software module in which the local variable is declared. In contrast, the software application, to which the software module belongs, may have any number of global variables. A global variable may have a global scope within the software application itself and is accessible to all the software modules that belong to the software application. When a software module is invoked, it may access or modify the value of a global variable, and the value modification is persistent even after the software module completes its execution.

In code under test 104 or form 114, when the value of a first variable is determined based on the value of a second variable (i.e., the value of the first variable depends on the value of the second variable), the first variable may be considered to depend on the second variable. A variable, whether input or output and whether local or global, usually has a specific data type, such as, for example and without limitation, character, string, integer, float, double, Boolean, pointer, array, and enumeration. The data type of a variable indicates what type of data (e.g., actual values) may be assigned to the variable. For example, only integer values should be assigned to a variable whose type is integer; and only true-false values should be assigned to a variable whose type is Boolean. Different programming languages may define different data types that the variables of the software modules or applications written in the specific languages may have, as well as different operations that may be applied to the specific data types. In particular embodiments, the data types of a programming language may include at least two categories: string and numeric. The numeric data type may include the non-string data types, such as, for example, integer, float, double, and Boolean. Furthermore, code under test 104 and form 114 may include string and numeric data types.

String is a data type that is available in many programming languages, although different programming languages may define the type "string" differently. For example, the Java programming language defines the type "string" as a Java class "java.lang.String", which represents a string as an immutable array of characters. In this case, once a string variable is declared and created, its value cannot be changed subsequently. Any modification to the value of a string variable results in a new string variable being declared and constructed. Class "java.lang.String" also provides many operations, referred to as "methods" that may be applied to a string variable. On the other hand, with C programming language, a string may be defined as a one-dimensional character array that terminates with a null character. A string in the C programming language is mutable such that its value may be modified in-place. In fact, each character in the array may be modified individually.

A programming language may generally define several numeric data types, although the specific numeric data types available may vary from language to language. Integer, float, double, and Boolean are numeric data types that are commonly defined by most programming languages. Again, different programming languages may define specific numeric data types differently. For example, the Java programming language provides two ways to declare an integer variable: either as a primitive data type "int", or as a Java class "java.lang.Integer". Class "java.lang.Integer" provides operations (i.e., methods) that may be applied an integer variable. On the other hand, the C programming language provides three primitive data types, "short", "int", and "long", that may be used to declare integer variables having different data sizes.

Code under test 104 and form 114 may include various constraints, including both numeric constraints and string constraints. Furthermore, analysis of code under test 104 and form 114 may yield additional such constraints. Some applications, such as web applications, may include large numbers of string variables or character arrays leading to string constraints. A constraint may include a restriction on the value of an input, output, local or intermediate variable of a software module of code under test 104 or form 114. The constraints placed on a variable may specify, for example, what values may be assigned to that variable, the size of the data values that may be assigned to the variable, or any other applicable conditions or limitations placed on the variable. Such variable constraints may be specified by or derived from the symbolic execution of code under test 104 or form 114, design specification or formal requirements of code under test 104 or form 114, the specification of the programming language used to implement code under test 104 or form 114, the code included in or the programming logic of code under test 104 or form 114, a document object model of code under test 104 or form 114, the runtime environment within which code under test 104 or form 114 is to be executed, or other applicable factors.

The nature of a constraint may depend upon the data type of the associated variable. For example, a constraint for an integer a may be (a>5) for an integer, (b=TRUE) for a Boolean b, or (c="rst") for a string c. A set of constraints may make up a formula. A formula may have mixed data types with regards to individual constraints. For example, a Boolean formula of integer constraints may be ((a>5) && (b<=6) && (a==b)). A formula may have a solution. In the above example, (a=b=6). Typically, numeric formulas may only include integer, real, and Boolean values. A constraint solver may be employed to solve linear operations with functions including numeric formulas.

Constraints involving strings may operate differently than constraints for Booleans or numbers. Possible string operations may depend on the operations implemented in a given programming or other computer language. For example, the function s1.concat(s2) may concatenate the string variables s1 and s2 and return the resulting string. The function s1.equals(s2) may return a Boolean indicating whether string variables s1 and s2 are equal. The function s1.startswith ("abc") may return a Boolean indicating whether string variable s1 begins with the substring "abc". The function s1.length( ) may return an integer indicating the number of elements within the string variable s1. The function s1.substring(2, 4) may return a string that is a substring of the string variable s1 beginning at index two and ending at index four. The function s1.endswith(s2) may return a Boolean indicating whether the string variable s1 ends with the elements of string variable s2. The function s1.trim( ) may return a string with one or more elements removed from the end of the string variable s1. The function s1.lastIndexOf(char) may return an integer indicating the index of the last instance of the variable character in the string variable s1. Consequently, constraints may be placed upon string variables commensurate with the data type returned. For example, a constraint may be placed on a string variable s1 specifying that the length of string variable s1 must be eight. In this case, the constraint placed on string variable s1 may be represented as an equation in which (s1.length( )=8).

Sometimes, a constraint placed on one variable of code under test 104 or form 114 may depend, directly or indirectly, on the constraint placed on the value of another variable of code under test 104 or form 114. For example, two constraints may be jointly placed on an integer variable b specifying that: (1) integer variable b may only be assigned integer values that is greater than or equal to −10; and (2) integer variable b may only be assigned integer values that are less than the value of variable a. In this case, the two constraints placed on integer variable b in combination with each other may be represented as ((b>=−10) && (b<a)).

Code under test 104 or form 114 may include any number of numeric or string variables, and these variables may be either input variables or local (i.e., intermediate) variables of the software module. In particular embodiments, a set of constraints may be placed on a specific numeric or string variable of code under test 104 or form 114. However, it may not be necessary to place constraints on each variable of a software module. A given numeric variable may be associated with any number of numeric constraints or string constraints. For example, integer variable b may have a numeric constraint specifying that its value must be greater than or equal to −10 (e.g., constraint "b>=−10"). Integer variable b may also have a string constraint specifying that the text (i.e., string) representation of its value must equal to the string "182" (e.g., constraint "b.toString( )="182""). In this case, the set of constraints placed on integer variable b may include both numeric and string constraints, and therefore is a hybrid set of constraints (e.g., "(b>=−10) && (b.toString( )= "182")"). Similarly, in particular embodiments, a given string variable may be associated with any number of string constraints or numeric constraints. For example, string variable s may have a string constraint specifying that its value must begin with a substring "ca" (e.g., constraint "s.substring(0, 1)="ca"" or "s.startsWith("ca")"). String variable s may also have a numeric constraint specifying that its value must have a length of eight characters long (e.g., constraint "s.length ( )=8"). In this case, again, the set of constraints placed on string variable s may include both numeric and string constraints, and therefore may be associated with a hybrid set of constraints (e.g., "(s.substring(0, 1)="ca") && (s.length ( )=8)").

In particular embodiments, the constraints placed on a code under test 104 or form 114 may include all the constraints, in combination, placed on its variables, including input, output, and local variables, and including numeric and string variables. Using the above examples of integer variable b and string variable s, both belong to code under test 104 or form 114, the set of constraints placed on the portion of code under test 104 or form 114 being tested may include the logical conjunction of the two sets of constraints placed on variables b and s respectively, which equals "(b>=−10) && (b.toString ( )="182") && (s.substring(0, 1)="ca") && (s.length( )=8)". This may be considered a hybrid set of constraints because the set includes both numeric and string constraints.

Test module 106 may be configured to determine and solve a hybrid set of constraints placed on entities such as code under test 104 or form 114 that have any number of numeric or string variables. Furthermore, test module 106 may be configured to determine and solve a hybrid set of constraints placed on a specific variable. In particular embodiments, solving a set of constraints may include attempting to find one or more solutions that satisfy all the constraints included in the set.

In system 100, there may be any number of initial numeric constraints placed on specific numeric variables of code under test 104 or form 114, and any number of initial string constraints placed on specific string variables of code under test 104 or form 114. Initial constraints may be determined by, for example, design criteria of code under test 104 or form 114, or by previous iterations of symbolic execution of code under test 104 or form 114. More specifically, a set of numeric constraints may be specified for and placed on a particular numeric variable, or a set of string constraints may be specified for and placed on a particular string variable. Each set of constraints may include one or more specific constraints. For example, code under test 104 or form 114 may include an integer variable i, Boolean variable b, and string variable s. An initial set of numeric constraints, "nc1-i", may be specified for and placed on integer variable i; a set of numeric constraints, "nc1-v", may be specified for and placed on Boolean variable b; and a set of string constraints, "sc1-s", may be specified for and placed on string variable s. In particular embodiments, these initial sets of constraints (e.g., "nc1-i", "nc1-b", and "sc1-s") may be specified based on the design specification or formal requirements of code under test 104 or form 114.

Within code under test 104 or form 114, there may be any number of operations applied to specific numeric variables that take numeric input or produce numeric output. For example, an operation applied to integer variable i may be "r=i+10.3", which takes two numeric values, the value of i and "10.3", as input and produces a numeric value, the value of a real variable r, as output.

Within code under test 104 or form 114, there may be any number of operations applied to specific numeric variables of the software module, which take string input or produce string output. For example, an operation applied to Boolean variable b may be "b.toString( )", which produces a string value, which is a string representation of the value of Boolean variable b (e.g., the string "true" or "false"), as its output.

Within code under test 104 or form 114, there may be any number of operations applied to specific string variables of the software module, which take string input or produce string output. For example, an operation applied to string variable vs may be "s=vs.concat("abc")", which takes two string values, the value of vs and "abc", as input and produces a string value, the value of s, as output.

Within code under test 104 or form 114, there may be any number of operations applied to specific string variables of the software module, which take numeric input or produce numeric output. For example, an operation applied to string variable s may be "s.length( )", which produces a numeric value as its output indicating the number of characters contained in the value of string variable s. Another operation applied to string variable s may be "s.substring(5, 7)", which takes two numeric values as input.

Test module 106 analyze code under test 104 or form 114 and the sets of numeric constraints initially specified for and placed on specific numeric variables therein and the sets of string constraints initially specified for and placed on specific string variables therein. In particular embodiments, the numeric and string constraints may initially be placed on either the input or the intermediate (i.e., the local) variables of the software module.

Test module 106 may be configured to determine numeric or string constraints initially placed on an input variable of code under test 104 or form 114 according to the design specification or formal requirements of the software. Furthermore, test module 106 may be configured to determine numeric or string constraints initially placed on an intermediate variable of code under test 104 or form 114 by performing symbolic execution on code under test 104 or form 114.

Test module 106 may be configured to perform symbolic execution on code under test 104 or form 114 while assigning a symbolic value to input variables of the code under test 104 or form 114. Since an intermediate variable may depend, directly or indirectly, on one or more of the input variables, performing symbolic execution may result in, for the intermediate variable, a set of symbolic expressions indicating the dependency it has on the specific input variables. Test module 106 may be configured to then determine a set of constraints placed on the intermediate variable based on the set of symbolic expressions obtained for the intermediate variable and the constraints placed on the specific input variables upon which the intermediate variable depend. For example, suppose that i is an input variable; r is an intermediate variable; and "r=i+10". In this case, test module 106 performing symbolic execution may determine that intermediate variable r depends on input variable i. Further suppose that a numeric constraint has been placed on input variable i such that "i>0". Based on the result of the symbolic execution and the numeric constraint placed on input variable i, a numeric constraint may be determined for intermediate variable r such at "r>10".

In operation, test module 102 may be executing on electronic device 102. Test module 106 may receive electronic data to be, for example, evaluated, tested, or validated. Test module 106 may determine, for example, whether inputs exist for the electronic data for which formulas representing the operation of the electronic data may be satisfied. Test module 106 may receive initial constraints with the electronic data. The initial constraints may include constraints on the input or output of operating the electronic data.

The electronic data may include, for example, code under test 104 or form 114. Code under test 104 and form 114 may reside, for example, on electronic device 102, or on another machine or electronic readable media accessible by electronic device 102. Code under test 104 and form 114 may be transmitted to electronic device by, for example, network 116.

Test module 106 may determine branches of execution or operation of code under test 104 or form 114. Such branches may be determined through symbolic execution of code under test 104 or form 114. Steps of the execution paths of code under test 104 or form 114 may yield additional constraints to be applied to input, output, or intermediate variables of the execution path. Test module 106 may determine these sets of constraints for branches and endpoints of execution paths of code under test 104 or form 114. Some such constraints may be in the numeric domain; further, some such constraints may be in the string domain.

At endpaths in the execution paths of code under test 104 or form 114, test module 106 may evaluate the sets of constraints to determine whether the sets of constraints are satisfiable or unsatisfiable. If the set of constraints are satisfiable, then test module 106 may determine that the associated set of instructions, such as a software module, in code under test 104 or form 114 are valid. If the set of constraints are unsatisfiable, then test module 106 may determine that the associated set of instructions, such as a software module, in code under test 104 or form 114 contain an error, bug, infeasible program path, or other violation of design criteria. If the set of constraints cannot be solved within a given depth or time of execution, then test module 106 may determine that the validity of the associated portion of code under test 104 or form 114 cannot be determined without further execution. Test module 106 may store the determinations as part of results 108.

Figure 2:
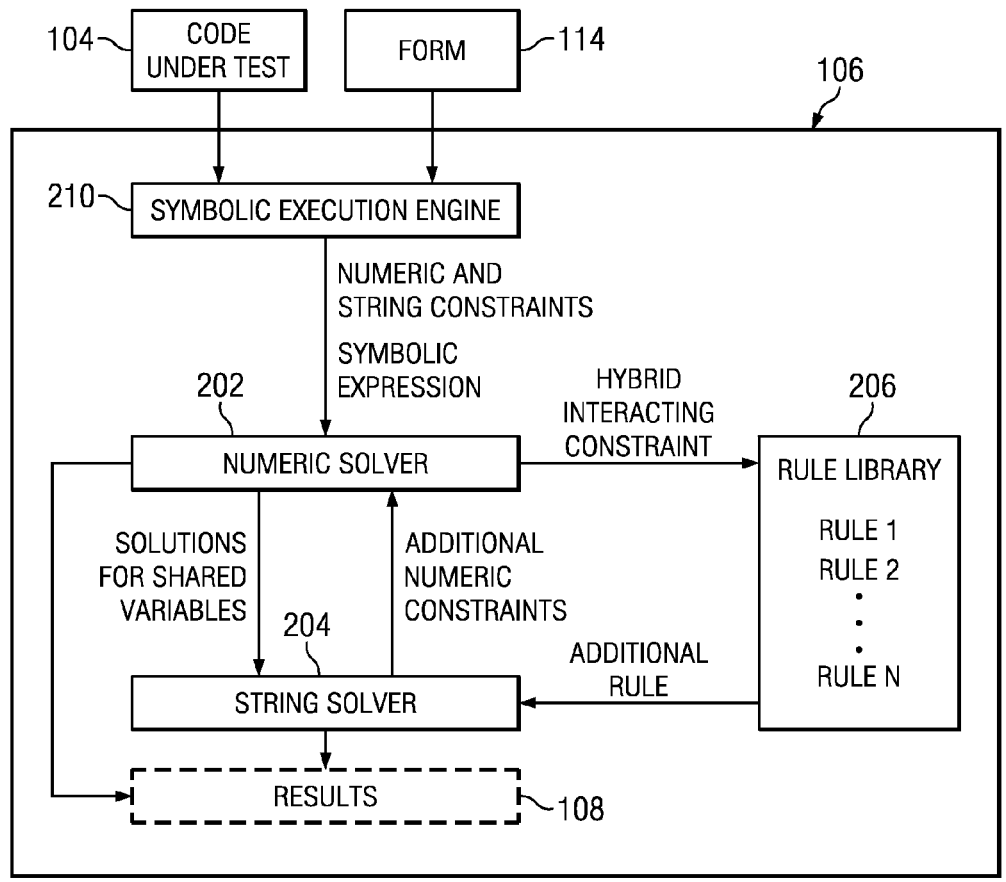
FIG. 2 is a more detailed view of an example embodiment of a test module.

FIG. 2 is a more detailed view of an example embodiment of test module 106. Test module 106 may include a symbolic execution engine 210, numeric solver 202, string solver 204, and rule library 206 each communicatively coupled to each other. Although individual components for symbolic execution engine 210, numeric solver 202, string solver 204, and rule library 206, test module 106 are shown individually, each may be combined or otherwise implement the functionality of another in any suitable fashion.

Symbolic execution engine 210 may be configured to symbolically execute code under test 104 or form 114. Symbolic execution engine 210 may be configured to determine sequences of instructions and apply symbolic execution to the sequences of instructions in order to determine constraints associated with the sequences of instructions. Such constraints may include numeric constraints and string constraints. Symbolic execution engine 210 may be configured to pass determined initial constraints to numeric solver 202 or string solver 204. Once sets of constraints are solved, determined to be satisfiable, or determined to be unsatisfiable by numeric solver 202 and string solver 204, symbolic execution engine 210 may be configured to determine additional sequences of instructions, apply symbolic execution to the sequences, and send the associated constraints to numeric solver 202 and string solver 204. Symbolic execution engine 210 may be configured to repeat such actions until, for example, code under test 104 or form 114 have been completely tested, limits on symbolic execution such as depth or time have expired.

Numeric solver 202 may be configured to solve for constraints associated with code under test 104 within the numeric domain. In doing so, numeric solver 202 may be configured to determine whether the constraints are satisfiable or unsatisfiable. The result of the analysis may include, for example, a determination in results 108 that the constraints are unsatisfiable, or numeric solutions solving for various criteria contained within the constraints if the constraints are satisfiable. The constraints may be, for example, received with code under test 104, derived from code under test 104, or received from string solver 204. The result of successfully solving the constraints may include values for variables that successfully solve the numeric constraints. Numeric solver 202 may be configured to provide the solutions for variables shared with the string domain to string solver 204. Further, numeric solver 202 may be configured to determine or infer constraints for use within the string domain.

Numeric solver 202 may be configured to determine constraints for use within the string domain and to communicate such constraints to string solver 204 by providing a determined constraint to rule library 206. In one embodiment, numeric solver 202 may be configured to provide a hybrid constraint, wherein the constraint is expressed in the numeric domain but involves conditions upon strings. The numeric domain constraint may be interpreted, looked up, or otherwise used by rule library 206 to provide string domain constraints to string solver 204.

If solutions for the constraints within the numeric domain are determined, numeric solver 202 may be configured to provide the solutions to string solver 204. If no solutions are possible within the numeric domain given the constraints received or derived, numeric solver 202 may be configured to determine that code under test 104 is unsatisfiable, which may indicate that code under test 104 contains an error, bug, infeasible program path, infeasible program path, or other violation of a design of the code. Numeric solver 202 may be configured to provide such determinations in output 108.

Numeric solver 202 may be implemented by any suitable mechanism, such as a program, software, function, library, software-as-service, analog or digital circuitry, or any combination thereof.

String solver 204 may be configured to attempt to determine whether string constraints and values received as solutions for shared variables from numeric solver 202 are satisfiable. String solver 204 may be configured to apply the received solutions from numeric solver 202 to known string constraints to make the determination of whether the constraints and values are satisfiable. Constraints and values may be received from, for example, constraints from symbolic execution engine 210, design constraints of code under test 104, derived constraints, values from numeric solver 202, or additional rules received from rule library 206. String solver 204 may be configured to determine, for example, that the constraints and values are satisfiable, unsatisfiable, or that no definitive determination concerning satisfiable or unsatisfiable could be reached.

String solver 204 may be configured to evaluate the string constraints and values through any suitable mechanism or method. For example, string solver 204 may be configured to compare a newly received additional rule from rule library 206 against existing or previously received constraints to determine whether, given the new rule, any solutions for any values received from numeric solver 202 are possible. If not, string solver 204 may be configured to determine immediately that the constraints are unsolvable. Determining solutions for a newly received rule against existing constraints may be accomplished by evaluating whether logical inconsistencies exist between the new rule and the existing constraints. For example, if existing constraints specify that the last character of a string must be a "." and the new rule specifies that the last character must be a numerical character, then no solutions exist. In another example, if existing constraints specify that string must be no larger than four characters long and a new rule specifies that the substring "abcde" must be present, then no solutions exist. Comparing the new rule versus existing constraints may be performed within one iteration of the operation of string solver 204. Such performance may contrast with the processing required for evaluating values received from numeric solver 202 in view of the string constraints, as described below. If an inconsistency is found, or if is otherwise determined that no solutions are possible, then string solver 204 may be configured to immediately determine that the constraints are not satisfiable. String solver 204 may be configured to send such determinations into results 108. If no inconsistencies are found, then string solver 204 may proceed to evaluate the received solution values from numeric solver 202 in view of the string constraints.

In order to evaluate received solution values from numeric solver 202 in view of the existing string constraints, string solver 204 may be configured to perform any suitable analysis, such solving for test cases at the end of a test path, solving for requirements and assertions at the end of a path, or solving for the intersection of a hotspot finite state machine. These techniques are described, for example, in the application, "Solving Hybrid Constraints to Validate a Security Software Module for Detecting Injection Attacks," U.S. patent application Ser. No. 12/838,061, which is incorporated herein.

The techniques employed by string solver 204 for evaluating the received values from numeric solver 202 in view of string constraints may be capable of proving that the combination is satisfiable. Such a satisfiable result may be shown by iterating through possible string values until a string is determined that satisfies both the numeric domain solutions received and the string domain constraints. String solver 204 may be configured to provide a determination that the combination is satisfiable in results 108.

However, evaluating received solution values from numeric solver 202 in view of the existing string constraints may require many iterations by string solver 204 as different strings are repeatedly tried. Furthermore, due to the dynamic size of strings, the evaluation techniques may not be capable of proving a definitive determination that the combination is unsatisfiable when evaluating the received values in view of string constraint. This inability may be in contrast to the numeric domain, wherein numeric solver 202 may evaluate constraints with elements of fixed size. Consequently, limits may be placed on the evaluation techniques of string solver 204 for evaluating the received values from numeric solver 202 in view of string constraints. Such limits may include depth or time limits. Once such limits are reached, if string solver 204 has not yet proven that the solution values from numeric solver 202 in view of the existing string constraints are satisfiable, then string solver 204 may pass execution back to numeric solver 202. At such a point, although satisfiability has not yet been proven, neither has unsatisfiability been proven. Thus, system 100 may continue to analyze code under test 104 or form 114. In such a case, string solver 204 may indicate to numeric solver 202 that all the constraints have not yet been proven satisfiable or unsatisfiable.

Furthermore, string solver 204, during its analysis, may determine additional string domain constraints. These additional derived string domain constraints may be used to further analyze the received numeric solutions, as well as be compared against existing string domain constraints for inconsistencies. Some of these string domain constraints may have implications on numeric constraints. Consequently, string solver 204 may be configured to provide these numeric constraints to numeric solver 202. In one embodiment, Numeric solver 202 may be configured to repeat its analysis incorporating these newly received or determined numeric constraints to, for example, determine that the constraints are unsatisfiable or produce a different set of numeric solutions for which string solver 204 will analyze.

The result of determining that the constraints and values are satisfiable may indicate that a particular portion on code under test 104 or form 114 is free from detected errors for the portions examined. String solver 204 may be configured to store such a satisfiable result in results 108.

String solver 204 may be implemented by any suitable mechanism, such as a program, software, function, library, software-as-service, analog or digital circuitry, or any combination thereof.

Rule library 206 may be configured to provide generalized, relaxed, or over-approximated rules to numeric solver 202 or string solver 204. The generalized, relaxed, or over-approximated rules may be determined by analyzing solutions or constraints. For example, given a numeric solution defined in the numeric domain from numeric solver 202, rule library 206 may include an additional rule with criteria matching the numeric solution but defined in the string domain to be used by string solver 204. The additional rule may be an over-approximated rule covering the solution, but also covering additional conditions. The additional rule may be defined in the string domain. Rule library 206 may be configured to provide the additional rule to string solver 204. In another example, given a solution defined in the string domain from string solver 204, rule library 206 may include an additional rule with criteria matching the solution. The additional rule may be defined in the numeric domain. Rule library 206 may be configured to provide the additional rule to numeric solver 202. Rule library 206 may be implemented by any suitable mechanism, such as a program, software, function, database, file, server, library, software-as-service, analog or digital circuitry, or any combination thereof.

Rule library 206 may include rules that, given a numeric value in the numeric domain, one or more string operations upon the numeric value must be true. As a result, the contents of rule library 206 may include string constraints associated with string functions performed on elements of the numeric domain. Thus, contents of rule library 206 may differ from other hybrid string-numeric constraints in that the contents of rule library are independently evaluated, without regard to the execution path. Such string functions might not be specified by the execution path of code under test 104 or form 114, but instead may be independent. Consequently, the contents of rule library 206 may not necessarily correspond to any code in the execution path. The contents of rule library 206 may be evaluated against any suitable numeric entities in the numeric domain, such as solutions determined by numeric solver 202. The solutions may be provided by numeric solver 202 to string solver 204. As described above, a matching rule from rule library 206 may be provided to string solver 204 in addition to the determined solutions from numeric solver 202. String solver 204 may evaluate the new rule received from rule library 206, which may include a new string constraint, to determine whether the addition of the new string constraint in view of the existing string constraints indicates that no solutions are possible.

For example, if, numeric solver 202 determines that, based on the numeric constraints, a possible solution for an integer variable a is five, then the solution may match one or more rules from rule library 206. An example rule may include matching criteria of, for example, that a determined value in the numeric domain is greater than zero. Since the value of variable a is five, and is thus greater than zero, a would match the example rule in question. The example rule may be that, for any entity in the numeric domain determined to be positive, a string created from the entity itself cannot have a negative sign ("−") as a leading character. A constraint in the FSM associated with this rule may be sent to string solver 204.

One or more rules of rule library 206 may similarly match a solution in the string domain and may result in an additional numeric constraint to be applied by numeric solver 202. For example, if the first character of a string s, which may be a string representation of a number variable, is not the character "−" then the solution may match a rule that the number corresponding to string s must be greater than zero. The rule may result in a constraint that (s>=0) being applied by numeric solver 202.

In operation, symbolic execution engine 210 may symbolically execute code under test 104 or form 114. Symbolic execution engine 210 may determine branches in the instructions of code under test 104 or form 114, as well as possible input, output, and intermediate variables. Symbolic execution engine 210 may produce execution paths that are to be tested or validated. Symbolic execution engine 210 may infer or determine constraints, some of which may be determined by selection of execution branches, to be provided to numeric solver 202 and string solver 204. Such constraints may include hybrid string-numeric constraints. Furthermore, symbolic execution engine 210 may provide a symbolic expression to which the constraints will be applied. From such input, numeric solver 202 and string solver 204 may determine whether the symbolic expression is satisfiable or unsatisfiable given the constraints.

Numeric solver 202 and string solver 204 may receive initial constraints. The initial constraints may be determined through, for example, symbolic execution and may represent constraints upon input, output, or intermediate variable values. In one embodiment, numeric solver 202 may make the first attempt to determine whether any solutions are possible given the constraints. In another embodiment, string solver 204 may make the first attempt to determine whether any solutions are possible given the constraints.

Numeric solver 202 may determine whether, given the constraints known in the numeric domain, any numeric solutions to shared variables in the received expression exist. If not, then numeric solver 202 may determine that the expression is unsatisfiable. Numeric solver 202 may further determine whether any hybrid string-numeric constraints may be derived or inferred from the set of numeric constraints. If so, the string interpretation of the constraints may be provided to string solver 204. Furthermore, the numeric solutions may be provided to string solver 204.

If numeric solver 202 determines that the expression is unsatisfiable, operation for the present expression may cease and test module 106 may record the results 108 indicating that an error, bug, infeasible program path, or other design constraint violation has occurred.

Numeric solver 202 or rule library 206 may determine that a solution of numeric solver 202 corresponding to a shared variable matches a rule of rule library 206. The rule may be expressed in terms of a string condition. The rule may reflect a string operation upon the numeric solution. Matching the rule may be made independently of the operations of the expression under test. Numeric solver 202 or rule library 206 may perform operations on the numeric solution to determine whether it matches one or more rules from rule library 206. If one or more rules from rule library 206 match the numeric solution, then a string constraint corresponding to the rule may be provided to string solver 204.

String solver 204 may determine whether an additional rule has been received from rule library 206. If so, the additional rule may be evaluated against other known string constraints, to determine whether any solutions are possible to solve the union of the string constraints. String solver 204 may use any suitable method or mechanism to evaluate the string constraints, including comparing hotspot finite state machines or solving for requirements and assertions. In one embodiment, string solver 204 may determine whether the intersection of the new constraint and the existing constraint is a null set. Such an evaluation may be performed without multiple iterations to attempting otherwise to solve the string expression with the numeric values. If the evaluation of the new string constraint in view of the existing string constraints shows that the expression is unsatisfiable, string solver 204 may determine that the expression is unsatisfiable, operation for the present expression may cease, and test module 106 may record the results 108 indicating that an error, bug, infeasible program path, or other design constraint violation has occurred.

Even if the evaluation of the new string constraint in view of the existing string constraints does not show that the expression is unsatisfiable, then string solver 204 may still not yet have proven that the expression is satisfiable. In such a case, string solver 204 may continue to attempt to find solutions for the string constraints of the expression.

String solver 204 may attempt to find solutions for the string constraints in view of numeric solutions received from numeric solver 202 in any suitable manner, such as solving for requirements and assertions, solving test cases at the end of an execution path, or comparing the intersection of the execution path and a hotspot FSM. String solver 204 may make such attempts, for example, upon receipt of the numeric solutions from numeric solver 202, or upon determining that an additional string constraint received from rule library 206 will not immediately prove unsatisfiability.

String solver 204 may determine whether or not a limit on execution has been reached. Such a limit may include time or depth of execution. If the limit has been reached, then test module 106 may cease searching for a solution to the expression and report the findings in results 108. If the limit has not been reached, string solver 202 may report findings to numeric solver 202.

During the evaluation of string constraints, string solver 204 may infer or determine additional string constraints or numeric constraints. String solver 204 may send an indication to numeric solver 202 that the satisfiability of the expression has not yet been determined, along with any additional, determined numeric constraints. During the next execution of numeric solver 202, numeric solver 202 may add these numeric constraints to its determination of possible numeric solutions. Thus, a successive iteration of the operation of numeric solver 202 may provide numeric solutions more likely to prove or disprove satisfiability, as the numeric solutions are created or disproved with a more constrained set of parameters.

Numeric solver 202 and string solver 204 may continue to exchange information and search for solutions for all variables until a limit of execution has been reached, the satisfiability of the expression has been proven, or the unsatisfiability of the expression has been proven. If either solver determines that the expression unsatisfiable with any combination of strings and numerics, the operation of numeric solver 202 and string solver 204 may cease and test module 106 may report the unsatisfiable findings in results 108. If the string solver determines that there is a string by which the string constraints may be satisfied, given possible numeric solutions, then the operation of numeric solver 202 and string solver 204 may cease and test module 106 may report the satisfiable findings in results 108. If the limit of execution has been reached, the failure to reach a definite finding as to satisfiability may be reported.

Figure 3:
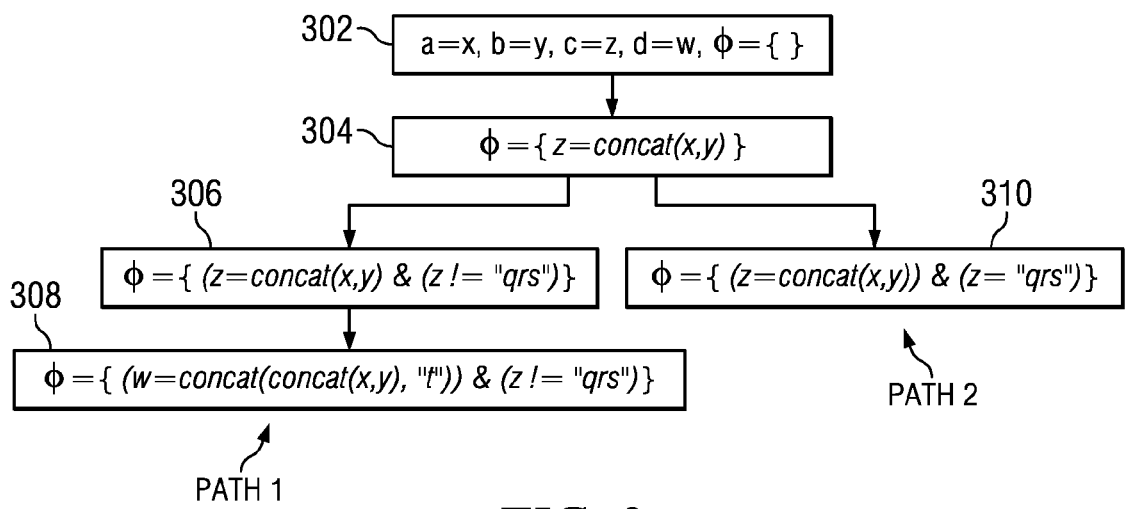
FIG. 3 is an illustration of the operation of symbolic execution by the system.

FIG. 3 is an illustration of the operation of symbolic execution by system 100. Such operation may be conducted partially or fully by, for example, symbolic execution engine 210.

In the field of computer science, symbolic execution may refer to the analysis of software programs by tracking symbolic rather than actual values, as a case of abstract interpretation. Symbolic execution may be a non-explicit state model-checking technique that treats input to software modules as symbol variables. It may create complex mathematical equations or expressions by executing all finite paths in a software module with symbolic variables and then solving the complex equations with solvers to obtain error scenarios, if any. Such solvers may include, for example, numeric solver 202 and string solver 204. In contrast to explicit state model checking, symbolic execution may be able to work out all possible input values and all possible use cases of all input variables in the software module under analysis. To further explain symbolic execution, consider an example software module named "foo":

| | SAMPLE CODE |
|---|---|
| 1 | foo (a, b) { |
| 2 | string a, b, c, d; |
| 3 | c = a.concat(b); |
| 4 | if !(c.equals("qrs")) { |
| 5 | d = c.concat("t"); |
| 6 | return d; |
| 7 | } else { |
| 8 | return c; |
| 9 | } |
| 10 | } |

Software module "foo" has two input variables a and b and two local variables c and d. In particular embodiments, the value of a local variable may depend, directly or indirectly, on the value of one or more input variables of the software module. For example, with module "foo", the value of local variable c depends directly on the values of input variables a and b, as indicated by line 3 of the code; and the value of local variable "d" depends indirectly on the values of input variables a and b, through local variable c, as indicated by line 5 of the code. In addition, module "foo" contains a conditional branching point at line 4 of the code, caused by the "if-else" statement. The conditional branching point at line 4 is associated with a branching condition "!(c.equals("qrs"))". Depending on whether this branching condition is satisfied or holds true—that is, whether local variable c equals "qrs"— module "foo" proceeds down different execution paths and different portions of the code of module "foo" is actually executed. More specifically, if local variable c does not equal "qrs", then the value of local variable "d" is computed and returned, as indicated by lines 5 and 6 of the code. On the other hand, if local variable c does equal "qrs", then the value of local variable c is returned, as indicated by line 8 of the code.

When symbolic execution is performed on module "foo" by, for example, symbolic execution engine 210, its input and local variables are each assigned a symbolic value instead of an actual value. In this example, symbolic execution engine 210 may assign input variable a the symbolic value "x"; input variable b the symbolic value "y"; local variable c the symbolic value "z"; and local variable "d" the symbolic value "w". Since variables a, b, c, and "d" are of string type, symbolic values "x", "y", "z", and "w" each represent an arbitrary string.

In addition, "Φ" may be the symbolic expression that represents the result of the symbolic execution at various points along the execution paths. More specifically, at 302, which corresponds to line two of the code of module "foo", variables a, b, c, and "d" are assigned their respective symbolic values "x", "y", "z", and "w", and "Φ" initially has an empty or null expression. As the execution proceeds further, expressions may be added to "Φ" depending on what code has been executed. At 304, which corresponds to line 3 of the code of module "foo", "Φ" has the expression "z=concat(x, y)" because line 3 of the code is "c=a.concat(b)" and "x", "y", and "z" are the symbolic values assigned to variable a, b, and c, respectively. Next, line 4 of the code of module "foo" is a conditional branching point and there are two possible execution paths down which the execution may proceed. Thus, the symbolic execution may also proceed down two different paths from 304: the first path, PATH 1, includes 306 and 308 corresponding to lines 5 and 6 of the code; and the second path, PATH 2, includes 310 corresponding to line 8 of the code.

In order to proceed down PATH 1, variable c does not equal "qrs", which means symbolic value "z" does not equal "qrs". Therefore, the expression "z !="qrs"" is added to "Φ" at 306. Conversely, in order to proceed down PATH 2, variable c does equal "qrs", which means symbolic value "z" equals "qrs". Therefore, the expression "z="qrs"" is added to "Φ" at 310. Along PATH 1, the value of variable "d" is determined at line 5 of the code, which corresponds to 308. Therefore, the expression "w=concat(z, "t")" is added to "Φ" at 308. Note that because "z=concat(x, y)", the expression for "w" may be rewritten as "w=concat(concat(x, y), "t")". 308 is the end of PATH 1, and thus, the expression of "Φ" at 308 represents the conditions, in symbolic form, that need to be satisfied in order to reach the end of execution PATH 1. Similarly, 310 is the end of execution PATH 2, and thus, expression of "Φ" at 310 represents the conditions, in symbolic form, that need to be satisfied in order to reach the end of PATH 2.

Since module "foo" has two possible execution paths, symbolic execution engine 210 symbolically executing module "foo" results in two sets of expressions, one corresponding to each execution path. Symbolic execution engine 210 may send such sets of expressions to solvers such as numeric solver 202 and string solver 204. In particular embodiments, solving for the expression of "Φ" at 308 may provide actual values for input variables a and b that cause module "foo" to reach the end of PATH 1; and solving for the expression of "Φ" at 310 may provide the actual values for input variables a and b that cause module "foo" to reach the end of PATH 2.

To solve the sets of expressions resulted from performing symbolic execution on the software module, particular embodiments may represent each set of expressions as a set of constraints placed on the variables of the software module. For example, with module "foo", the set of expressions at 308 may be represented as a set of constraints placed on variables a, b, c, and "d" as $$(d = concat(concat(a, b,), ``t'')) \&\&$$
$$(c = concat(a, b)) \&\&$$
$$(c\ !=\ ``qrs'')".$$

The set of expressions at 310 may be represented as a set of constraints placed on a, b, c, and "d" as "(c=concat(a, b)) && (c="qrs")".

For each set of constraints obtained from performing symbolic execution on the software module, particular embodiments may represent each numeric constraint from the set as an applicable mathematical equation and each string constraint from the set as a finite state machine ("FSM"). Each step of an execution path may include constraints including numeric constraints, represented as mathematical equations and the string constraints are represented as FSMs. At the end of an execution path, the set of constraints may be solved.

Returning to FIG. 2, test module 106, including numeric solver 202 and string solver 204, may attempt to find solutions for each set of constraints shown in the paths of FIG. 3. A solution for a set of constraints may include actual values for the variables on which the constraints are placed that satisfy all the constraints in the set. When evaluating the test paths, these actual solution values may be assigned to the variables as test input. Given a solution found for a set of constraints, since the solution values together satisfy all the constraints from the corresponding set of constraints, and the set of constraints corresponds to a set of expressions (e.g., obtained from the symbolic execution) that represents the state as a particular execution path is traversed, test module 106 ensures that the testing proceeds along and reaches the end of the particular execution path. Consequently, code under test 104 or form 114 is fully tested if the specific solution values are assigned to the corresponding variables as test input. Furthermore, test module 106 may find a solution for each and every set of constraints corresponding to each and every set of expressions obtained for each and every execution path of the software module. If the solution values are applied as test input (e.g., by applying the actual values of one solution at a time), then all the possible execution paths of the software module may be fully tested. If there is any error in any of the execution paths, such systematic testing may be able to catch it eventually.

Design or specification requirements of code under test 104 or form 114 may be satisfied by placing these requirements on the input or output of the code under test 104 or form 114. A specification requirement placed on the input may be referred to as a pre-condition, and a specification requirement placed on the output of a software module may be referred to as a post-condition.

Code under test 104 or form 114 may include any number of conditional branching points (e.g., the "if-else" statements), and each conditional branching point has a branching condition specified by one or more variables (e.g., input variables or local variables). Depending on whether the branching condition is satisfied, the operation may proceed down different execution paths. Thus, when during execution, code under test 104 or form 114 may proceed down any one of the possible execution paths resulted from the conditional branching points. Consequently, when validating formal specification requirements placed on input and output (i.e., the pre-conditions and post-conditions associated with the software module), code under test 104 or form 114 is considered to pass the validation test (i.e., satisfy the specification requirements) if and only if all the pre-conditions and post-conditions associated with the software module hold true for all possible execution paths of the software module.

Figure 4:
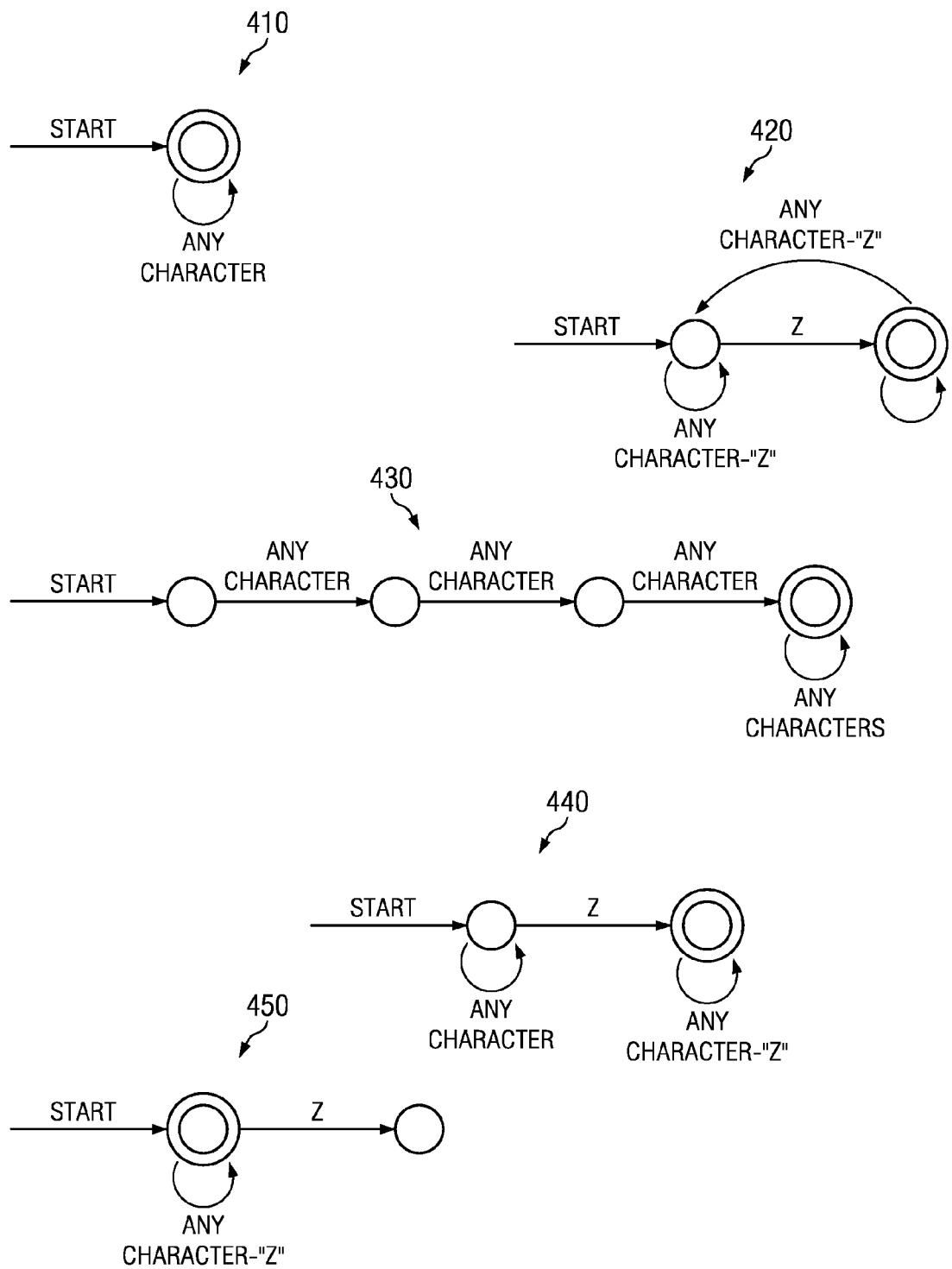
FIG. 4 is an illustration of example embodiments of graphs of finite state machines that may be used to represent strings and associated constraints.

FIG. 4 is an illustration of example embodiments of graphs of finite state machines that may be used to represent strings and associated constraints. Such FSMs may be used by string solver 204. String constraints may be expressed with an FSM. Furthermore, string solver 204 may use FSMs to compare string constraints for satisfiability, or to evaluate string constraints with numeric solutions received from numeric solver 202. An intermediate state in an FSM may be represented by a single circle, an accepting state represented by a double circle, and an input to a state represented by an arrow leading to the circle.

For example, FSM 410 may represent a string that may have any character and of any length. FSM 420 may represent a string S that has at least one character and the last character of the string is the character "Z", and may be used to represent the constraint "S.endsWith("Z")=true". FSM 430 may represent a string S that has three or more characters, and may be used to represent the constraint "S.length( )>=3". FSM 440 may represent a string S that has at least one character and contains at least one "Z" and the "Z" transition signifies the last "Z" in the string. FSM 450 represents a string S that does not have any character that is "Z" and may be used to represent the constraint "(a=S.lastIndexOf("Z"))". From this constraint it can be inferred that if "a>=0", then "(S.substring(a, a+1)="Z")". FSM 440 represents the case when the above constraints are satisfied; that is, string S contains at least one "Z" character and the last "Z" occurring in S is at the index that equals the value of a. On the other hand, FSM 350 represents the case when the set of constraints is not satisfied; that is, string S does not contain any character "Z", and thus "a=−1". Hence the constraint "a=S.lastIndexOf("Z")" results in a fork in the symbolic execution tree in symbolic execution engine 210 and on one branch it assumes the case of FSM 440 with additional numeric constraint "a>=0" while on the other branch it assumes the case of FSM 450 with additional constraint "a=−1".

Figure 5:
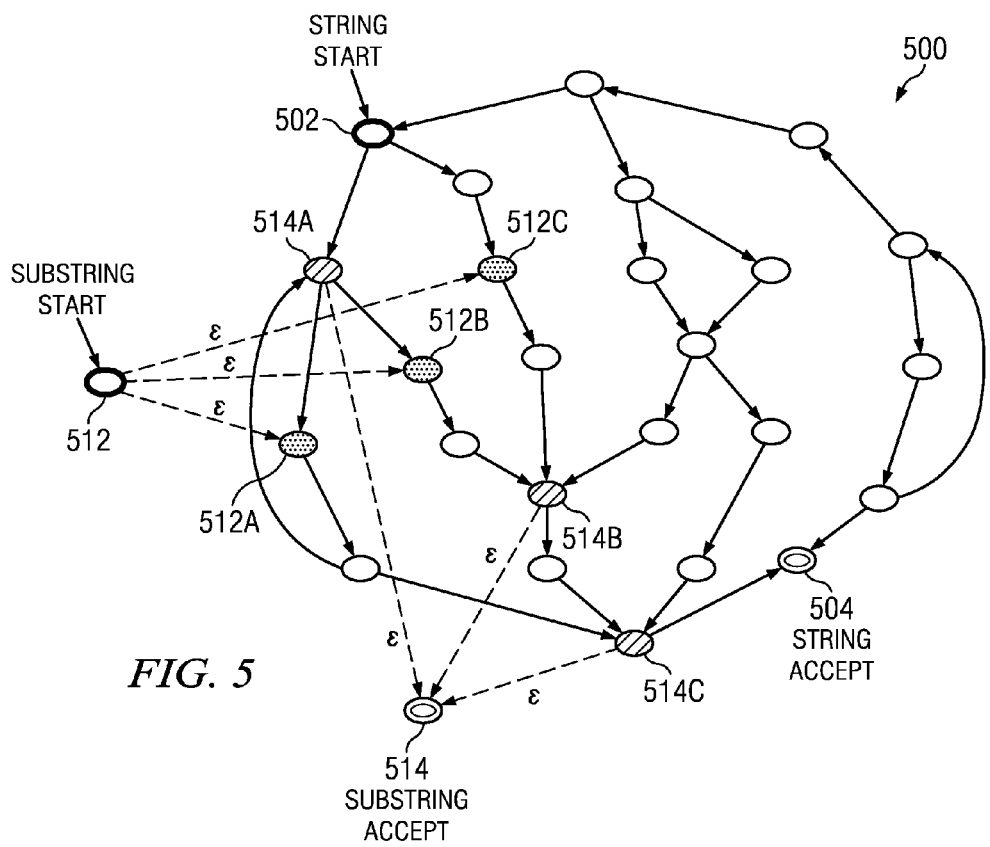
FIG. 5 is an illustration of an example finite state machine used to represent a string and one of its substrings.

FIG. 5 illustrates another example FSM 500 used to represent a string, S, and one of its substrings, "S.substring(2, 4)". FSM 500 may be used in evaluation by string solver 204 and may represent a constraint or product of constraints. In this example, state 502 may be the starting point of string S, and state 504 is the accepting state (i.e., the ending point) of string S. Substring "S.substring(2, 4)" may be the substring of S that beings at the third character and ends at the fifth character. Note that according to some programming languages, such as the Java programming language, indexing beings with zero; that is, the index number of the first element is zero. Therefore, index number 2 refers to the third element and index number 4 refers to the fifth element. For substring "S.substring(2, 4)", a starting point may be the third state down from starting state 502 of string S, which corresponds to the third character of string S. In FIG. 5, there are three states, 512A, 512B, 512C, that each are the third state down from starting state 502, and any one of them may be a possible starting state 512 for substring "S.substring(2, 4)". For substring "S.substring(2, 4)", an ending point (i.e., an accepting state) may be the fifth state down from starting state 502 of string S, which corresponds to the fifth character of string S. In FIG. 5, there are again three states, 514A, 514B, 514C, that are each the fifth state down from starting state 502, and any one of them is a possible accepting state 514 for substring "S.substring(2, 4)". Note that in FIG. 5, "ϵ" marks a null-input transition.

In particular embodiments, given any set of constraints, each numeric constraint from the set may be represented using an applicable mathematical equation, and each string constraint from the set may be represented using an applicable FSM.

Returning to FIG. 2, given a set of constraints thus represented, test module 106 may attempt to solve the constraints in order to find one or more solutions that satisfy all the constraints in the set at the same time, using, for example, numeric solver 202 and string solver 204. In particular embodiments, numeric solver 202 and string solver 204 may be constraint solvers implemented based in part on the Satisfiability Modulo Theories (SMT). Numeric solver 202 may take as input a set of constraints, which may include numeric constraints represented using mathematical equations. String solver 205 may take as input a set of constraints, which may include string constraints represented using FSMs, and attempt to find one or more solutions that satisfy all the constraints from the set. String solver 205 may also take as input solutions to constraints as determined by numeric solver 202.

It may be possible that a set of constraints may not have any solution that satisfies all the constraints from the set. For example, consider the set of constraints, $$\begin{aligned}&(s.equals(q))\ \&\&\\&(s.startsWith("uvw"))\ \&\&\\&(q.endsWith("xyz"))\ \&\&\\&(s.length(\ )<a)\ \&\&\\&((a+b)<6)\ \&\&\\&(b>0)\end{aligned}$$

where s and q are strings and a and b are integers. There is no combination of values for s, q, a, and b that can satisfy all the constraints from this set at the same time. Therefore, this particular set of constraints is unsatisfiable.

Numeric solver 202 and string solver 204 may be configured to infer constraints for the variables of code under test 104 or form 114 based on various factors. For example, numeric constraints may be inferred for both numeric and string variables and string constraints may be inferred for both numeric and string variables. Such inferences may be based on, for example, the point of code under test 104 or form 114 being symbolically executed, the operations applied to the specific variables, the specification of the programming language used, the runtime environment in which code under test 104 or form 114 is executed, or a combination of multiple factors.

Given a numeric variable, a string constraint may be inferred by numeric solver 202 based on an operation applied to the numeric variable that produces a string result. For example, suppose that the operations (i.toString( )).split ("0")) are applied to integer variable i, which first produces a string representation of the value of integer variable i (e.g., the number one-hundred eighty-two is represented as string "182") and then split the string into two new strings at the location of character "0". In order for the second operation (i.e., the string split operation) to be successful (e.g., not resulting in a null set) numeric solver 202 may be configured to infer a string constraint that the string representation of the value of integer variable i must include at least one character "0". Numeric solver 202 may be configured to determine the string constraint and provide it to string solver 204.

Given a numeric variable, a numeric constraint may be inferred by numeric solver 202 based on an operation applied to the numeric variable, which may produce a numeric result.

For example, suppose that the operation (Math.sqrt(i)) is applied to the integer variable i, which returns the square root of the value of integer variable i. In order to perform this operation without encountering an error, numeric solver 202 may be configured to infer a numeric constraint specifying that the value of integer variable i must be greater than or equal to zero.

Given a string variable, a string constraint may be inferred by string solver 204 based on an operation applied to the string variable, which may produce a string result. For example, suppose that operation "s.replaceAll("abc", "xyz")" is applied to the string variable s, which replaces all substrings "abc" found in the value of string variable S with a substring of "xyz". In order for the operation to have any actual effect on the value of string variable s, a string constraint may be inferred from the operation that the value of string variable s must include at least one occurrence of substring "abc".

Given a string variable, a numeric constraint may be inferred by string solver 204 based on an operation applied to the string variable, which may produce a numeric result, or may be based on an operation applied to the string variable, which may take one or more numeric inputs. For example, suppose that "s.startsWith("abc")" is applied to string variable s, which provides a Boolean result, as true or false, indicating whether the value of string variable s starts with substring "abc". In order to perform this operation successfully, the value of string variable s must have at least three characters. Thus, a numeric constraint may be inferred from this operation with a true result specifying that the length of string variable s must be greater than or equal to three. As another example, suppose that "s.substring(6)" is also applied to string variable s, which takes a numeric value as input. In order to perform this operation successfully (e.g., not resulting in a null set), the value of string variable s must have at least six characters. Thus, a numeric constraint may be inferred from this operation specifying that the length of string variable s must be greater than or equal to six.

Consequently, test module 106 may determine hybrid sets of numeric and string constraints that include both the specified and the inferred constraints placed on the variables of code under test 104 and form 114. Test module 106 may solve a hybrid set of constraints using an iterative algorithm. As described above, the string constraints from the set, represented using FSMs, may be solved by string solver 204 in a string domain, and the numeric constraints from the set, represented using mathematical equations, and may be solved by numeric solver 202 in a numeric domain. Test module 106 may then iteratively attempt to find one or more solutions in either the numeric domain or the string domain alone (i.e., solutions that satisfy either all the numeric constraints in the set or all the string constraints in the set), and feed the solutions found from one solver to the other solves, until: (1) one or more solutions are found to satisfy all the numeric and string constraints in the set (i.e., the set of constraints is satisfiable); (2) it is determined that there is no solution that satisfies all the constraints in the set (i.e., the set of constraints is unsatisfiable); or (3) the number of iterations performed has reached a predetermined threshold, whichever occurs first. Particular embodiments may solve the numeric constraints in the numeric domain using a Satisfiability Modulo Theory (SMT) solver, and solve the string constraints in the string domain using regular expression union, intersection, complement, Kleene star, and other applicable algorithms.

In addition, particular embodiments may take the following into consideration when attempting to find one or more solutions for a hybrid set of constraints. First, if the numeric solver 202 determines that numeric constraints in the numeric domain alone are unsatisfiable (i.e., there is no solution that satisfies just the numeric constraints in the set), then the entire set of constraints is unsatisfiable. Second, if the solution determined by string solver 204 for the string constraints in the string domain alone is a null set, then, if there is no numeric constraint in the set at all, then the set is unsatisfiable; otherwise, the numeric constraints in the set is further constrained by imposing additional constraints that the existing numeric solutions are not allowed in the next iteration.

To explain the iterative process further, consider an example set of constraints, s.startsWith("uvw") &&
s.endsWith("xyz") &&
(a = s.lastIndexOf("t")) &&
(s.length( ) <= b) &&
(b + c <= 8) &&
((a + d) >= 4)
&& (c > 0)
&& (d < 0)

where s is a string and a, b, c, and d are integers. A solution that satisfies this set of constraints means that there is a combination of five values for string s and integers "and a, b, c, and d, respectively, that causes all the individual constraints in the set to be satisfied (i.e., all the conditions to be true) at the same time. More specifically, in order to satisfy constraint "s.startsWith("uvw")", the first three characters of string s must be "uvw". In order to satisfy constraint "s.endsWith ("xyz")", the last three characters of string s must be "xyz". In order to satisfy constraint "a=s.lastIndexOf("t")", the last occurrence of character "t" in string s must have an index number that equals the value of integer a. In order to satisfy constraint "s.length( )<=b", the number of characters in string s must be less than or equal to the value of integer b. In order to satisfy constraint "b+c<=8", the sum of the values of integers b and c must be less than or equal to eight. In order to satisfy constraint "(a+d)>=4", the sum of the values of integers a and d must be greater than or equal to four. In order to satisfy constraint "c>0", the value of integer c must be greater than zero. In addition, in order to satisfy constraint "d<0", the value of integer d must be less than zero.

Figure 6:
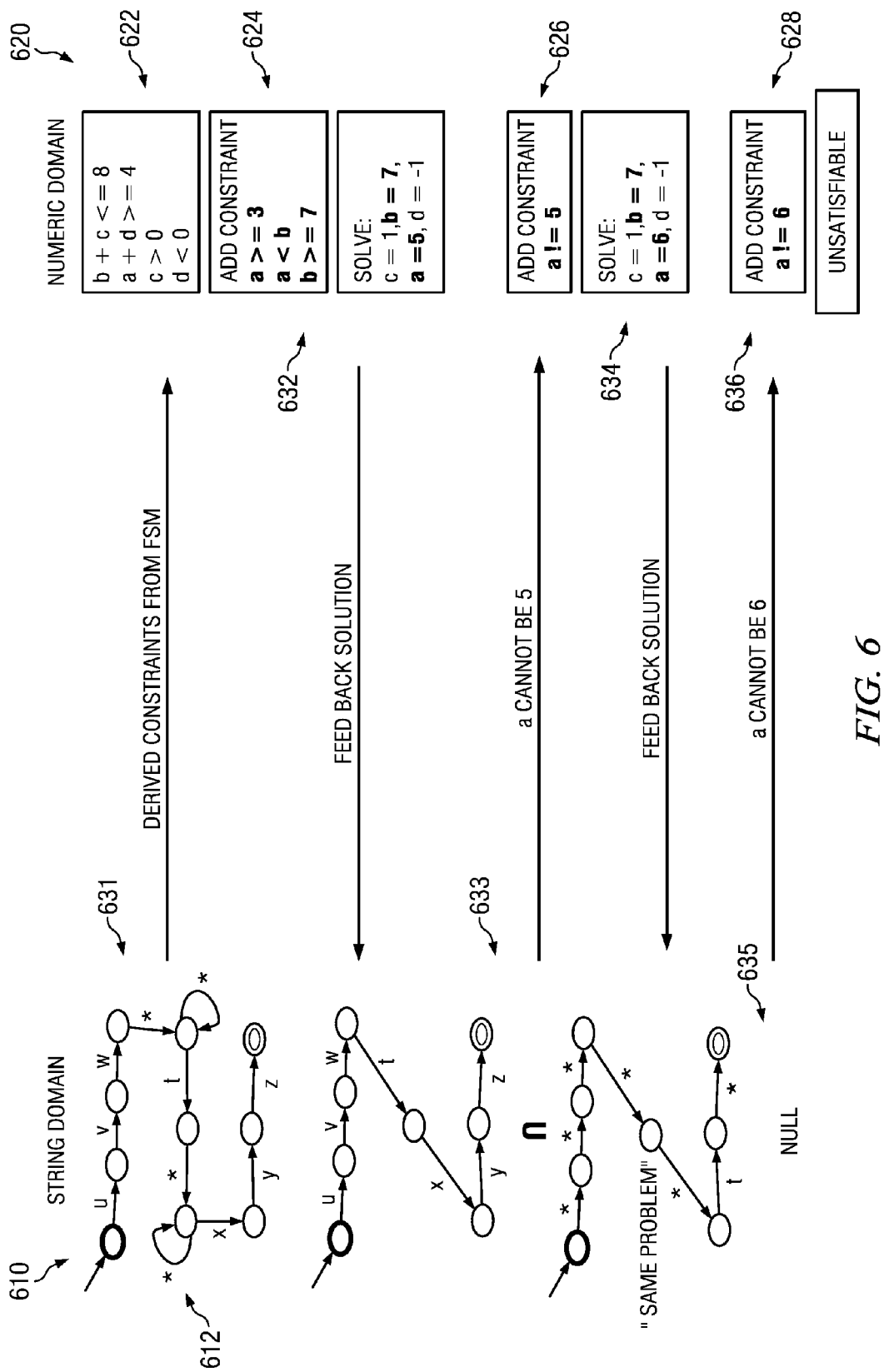
FIG. 6 is an illustration of the operation of a test module upon example string constraints.

FIG. 6 is an illustration of the operation of test module 106 upon the string constraints in the above example. String solver 204 may consider the string constraints 612 from the above example set of constraints in a string domain 610 and numeric solver 202 may consider the numeric constraints 622 from the above example set of constraints in a numeric domain 620. During the first iteration 631, string solver 204 may attempt to find a solution in string domain 610 alone. The three string constraints 612 together require that: (1) the first three characters of string s must be "uvw"; (2) the last three characters of string s must be "xyz"; (3) there must be at least one occurrence of "t" in string s; and (4) "t" must come after "uvw" but before "xyz". Therefore, the shortest string that satisfies all four requirements is "uvwtxyz". There are other possible longer strings that also satisfy all four requirements (e.g., "uvwabtthxyz" or "uvwt3fkxyz"). However, in one embodiment string solver 204 may select the simplest possible solution first (i.e., the shortest string or the smallest value that satisfy all the requirements dictated by the string or numeric constraints). In this case, one such shortest string that satisfies all four requirements is "uvwtxyz". This string solution, "uvwtxyz", found in string domain 610 is fed to numeric solver 202 using numeric domain 620 to help find a solution for integers a, b, c, and d.

During the second iteration 632, numeric solver 202 may derive additional constraints 624 placed on integers a, b, c, and d from the solution found for string s during the previous iteration (i.e., "uvwtxyz"). For example, constraint "s.length( )<=b" requires that the number of characters in string s must be less than or equal to the value of variable b. Because the shortest string solution for string s found in string domain 610 must have a minimum of seven characters, this means that "b>=7". Constraint "a=s.lastIndexOf("t")" may require that the last occurrence of character "t" in string s must have an index number that equals the value of integer a. Since "t" is not the last character in string s, this may mean that "a<b". In addition, since "t" cannot be any of the first three characters in string s, this also may mean that "a>=3". Numeric solver 202 may add the three additional numeric constraints 624 placed on integers a, b, and c, which are derived from the solution for string s, to the four numeric constraints 622 originally provided from the set, and attempt to find values for integers a, b, c, and d that satisfy all the numeric constraints 622, 624, including those originally from the set as well as those derived from the solution for string s. Again, if there are multiple values for integers a, b, c, and d that satisfy all the numeric constraints, numeric solver 202 may select the smallest values first. From the four original numeric constraints 622 from the set and the three additional, derived numeric constraints 624, numeric solver 202 may determine a possible solution for integers a, b, c, and d as "a=5", "b=7", "c=1" and "d=−1". For integer a, there may be two possible values, five and six. The value 5 is the smallest and therefore is selected first for integer a. Numeric solver 202 may feed these four values back to string solver 204 in string domain 610 to be verified against the string constraints.

During the third iteration 633, the solution for integers a, b, c, and d found by numeric solver 202 during the second iteration 632 may be verified by string solver 204 against the string constraints in string domain 610. If string s is "uvwtxyz", then integer a cannot equal five, because the index of character "t" is three, which should equal the value of integer a. String solver 204 may feed back this new constraint 526 on integer a (i.e., "a !=5") to numeric solver 202 in numeric domain 620.

During the fourth iteration 634, constraint 626, "a !=5", may be added to the other existing numeric constraints 622, 624. Numeric solver 202 may determine that the next possible solution for integers a, b, c, and d that satisfy all currently existing numeric constraints 522, 524, 526 is "a=6", "b=7", "c=1" and "d=−1". Numeric solver 202 may feed this solution is fed back to string solver 204 in string domain 510.

During the fifth iteration 635, the solution found for integer variables a, b, c, and d (i.e., "a=6", "b=7", "c=1" and "d=−1") by numeric solver 202 in numeric domain 620 during the previous iteration may be similarly verified by string solver 204 against the string constraints in string domain 610. If string s is "uvwtxyz", then variable a cannot equal six. This yields a new constraint 628 on variable a, "a !=6", which string solver 204 may feed back to string solver 602 in numeric domain 620.

During the sixth iteration 636, constraint 628, "a !=6", is again added to the other existing numeric constraints 622, 624, 626. Numeric solver 202 may attempt to find a solution that satisfies all numeric constraints 622, 624, 626, 628. However, there are no values integers a, b, c, and d that satisfy all currently existing numeric constraints 622, 624, 626, 628. Therefore, if string s equals "uvwtxyz", then there is no solution that can be found for integers a, b, c, and d that satisfies all the numeric constraints. Note that in this case, string s cannot have more than seven characters because of the three constraints "s.length( )<=b", "b+c<=8", and "c>0". More specifically, since "c>0", the smallest value integer c may have is one. Since "b+c<=8", if the smallest value integer c may have is one, then the largest value integer b may have is seven. This means that the longest length string s may have is seven characters because "s.length( )<=b". At this point, it has been determined that this set of constraints is unsatisfiable. Therefore, the process may stop.

Returning to FIG. 2, in one embodiment, numeric solver 202 may determine a hybrid constraint involving both numeric and string constraints. Based on such a hybrid constraint, numeric solver 202 may access one or more rules from rule library 206 matching the hybrid constraint. The rules may include a constraint defined within the string domain. The additional rule may be applied by string solver 204. The additional rule may be compared against other previously received constraints. If there are no strings for which the constraints may be solved, then string solver 204 may determine that the constraints are unsatisfiable. In one embodiment, this operation may be performed in a single iteration. In a further embodiment, if this operation yields an unsatisfiable determination, this operation may be performed without providing additional information to numeric solver 202. In another further embodiment, if this operation yields an unsatisfiable determination, this operation may be performed nor without attempting to solve string constraints with solutions provided by numeric solver 202. In still yet another further embodiment, if this operation does not yield an unsatisfiable determination, this operation may be performed in parallel, before, or otherwise in addition to attempting to solve string constraints with solutions provided by numeric solver 202.

FIG. 7 illustrates contents of example embodiments of rule library 206. Any suitable matching rules may be included in rule library 206. The contents of rule library 206 may be used to match numeric conditions in the numeric domain used by numeric solver 202, which yield a string condition to be applied by string solver 204. Furthermore, the contents of rule library 206 may be used in a reverse fashion, wherein the string conditions may be matched from string solver 204 to yield the associated numeric condition to be applied by numeric solver 202.

Rule 702 may include a criteria that the value of a number a is greater than or equal to zero. The criteria may be defined, for example, in numeric terms (a>=0) or string terms. A criteria defined in string terms may include a "value-of" function operation ("VOF"). VOF may be a string function determined to evaluate the numeric value of a number represented by a string. VOF may be configured to accept string inputs. Thus, providing a numeric-type value to VOF may require that the numeric-type be first converted to a string, or VOF may perform such operations automatically. In one embodiment, a given variable solution created by numeric solver 202 may be evaluated against rule 702 to determine if the solution is greater than or equal to zero. If so, then rule library 206 may determine that a string created from the number may not have a leading "−" character, which would indicate a negative value. Thus, a string constraint corresponding to, for example, "a.charAt(0) !='−'" may be selected and sent to string solver 204. The string constraint may be provided in FSM form.

Rule 704 may include a criteria that the value of a number a is less than zero. The criteria may be defined, for example, in numeric terms (a>=0) or string terms (VOF(a)>=0). In one embodiment, a given variable solution created by numeric solver 202 may be evaluated against rule 702 to determine if the solution is less than zero. If so, then rule library 206 may determine that a string created from the number may require a leading "−" character, which would indicate a negative value. Thus, a string constraint corresponding to, for example, "a.charAt(0)='−'" may be selected and sent to string solver 204. The string constraint may be provided in FSM form.

Rule 706 may include a criteria that the length of the result of converting a number a to a string and then removing all leading or trailing white spaces is equal to zero. Such a number may have no value associated with it at all. If so, then rule library 206 may determine that a string created from the number is undefined. Thus, a string constraint corresponding to an undefined FSM may be may be selected. Any determined a would thus contradict the selected FSM constraint in subsequent comparison in string solver 204.

Rule 708 may include a criteria that the value of a number a is greater than a positive integer p. Any suitable combination of a and positive integers p may be used. In one embodiment, a given variable solution created by numeric solver 202 may be evaluated against rule 702 to determine if the solution is greater than various positive integers p. The next-lowest positive integer below a may be determined by determining that VOF(a)>1, searching for a decimal point (".") in the string version of a, and returning the substring occurring before such a point. If the criteria is met, then rule library 206 may determine that the number of digits in a is greater than the $\log_{10}$ of the value of p. Thus, a string constraint corresponding to, for example, "(length(a)>$\log_{10}$(p)) && a.charAt(0) !='−'" may be selected and sent to string solver 204. The string constraint may be provided in FSM form.

Rule 710 may include a criteria that the value of a number a is less than a positive integer p. Any suitable combination of a and positive integers p may be used. In one embodiment, a given variable solution created by numeric solver 202 may be evaluated against rule 702 to determine if the solution is greater than various positive integers p. The next-lowest positive integer below a may be determined by, determining that VOF(a)>1, searching for a decimal point "." in the string version of a, and returning the substring occurring before such a point. If the criteria is met, then rule library 206 may determine that the number of digits in a is greater than the $\log_{10}$ of the value of p. Thus, a string constraint corresponding to, for example, "(length(a)>$\log_{10}$(p)) && a.charAt(0) !='−'" may be selected and sent to string solver 204. The string constraint may be provided in FSM form.

FIG. 8 is an illustration of an example embodiment of a method 800 for proving unsatisfiable formulas in an expression from software under test. In step 805, software to be tested may be determined. Such software may include code under test, a form, or other suitable electronic data. The software to be tested may be a specific module or portion of a larger piece of software.

In step 810, design parameters associated with the software may be determined. Such design parameters may include, for example, measure of acceptable operation. Further, in step 815 input and output constraints may be determined. Such constraints may be included, for example, in design parameters or may be given as testing parameters. The design parameters and input and output constraints may be expressed in a mix of numeric constraints and string constraints.

In step 820, the software may be symbolically executed. Any suitable mechanism or method of symbolic execution may be used. During symbolic execution, internal variables of the software may be determined. Furthermore, in step 825 constraints upon these variables or further constraints upon the input and output of the software may be determined. Subfunctions, submodules, or similar entities of the software may be evaluated as the software is executed. The subfunctions or submodules may be evaluated in terms of input and output from the subfunctions or modules, as well as with respect to their internal variables. Symbolic execution may be based upon determinations of branch points in the software, in which expressions may be constructed reflecting different branches. Each such expression may be analyzed; further, the expression itself may be symbolically executed. The result of symbolic execution may be an execution path, reflecting symbolic expressions and constraints upon the values of the symbols used therein. Steps 820, 825, and 830 may continue until a suitable point is reached for the generated expressions to be evaluated.

In step 835, the expressions generated by symbolic execution may be evaluated in view of the constraints that have been determined. Any suitable method of mechanism may be used to evaluate the expressions. In one embodiment, a rule-based method for numeric and string solving may be used. Such a method may be illustrated in method 900 FIG. 9. Method 900 may implement fully or in part step 835 or other suitable portions of method 800.

In step 840, it may be determined whether symbolic execution has finished. In one embodiment, such a determination may be made if software program has been completely symbolically executed. In another embodiment, such a determination may be made if an error of a crucial or critical type has been determined through previous iterations of symbolic execution. In yet another embodiment, such a determination may be made by determining whether symbolic execution has been performed for a threshold depth or time of execution.

If symbolic execution has not finished, method 800 may repeat one or more steps, such as 820-840, for other portions of the software being tested. If symbolic execution has finished, method 800 may terminate.

Figure 9:
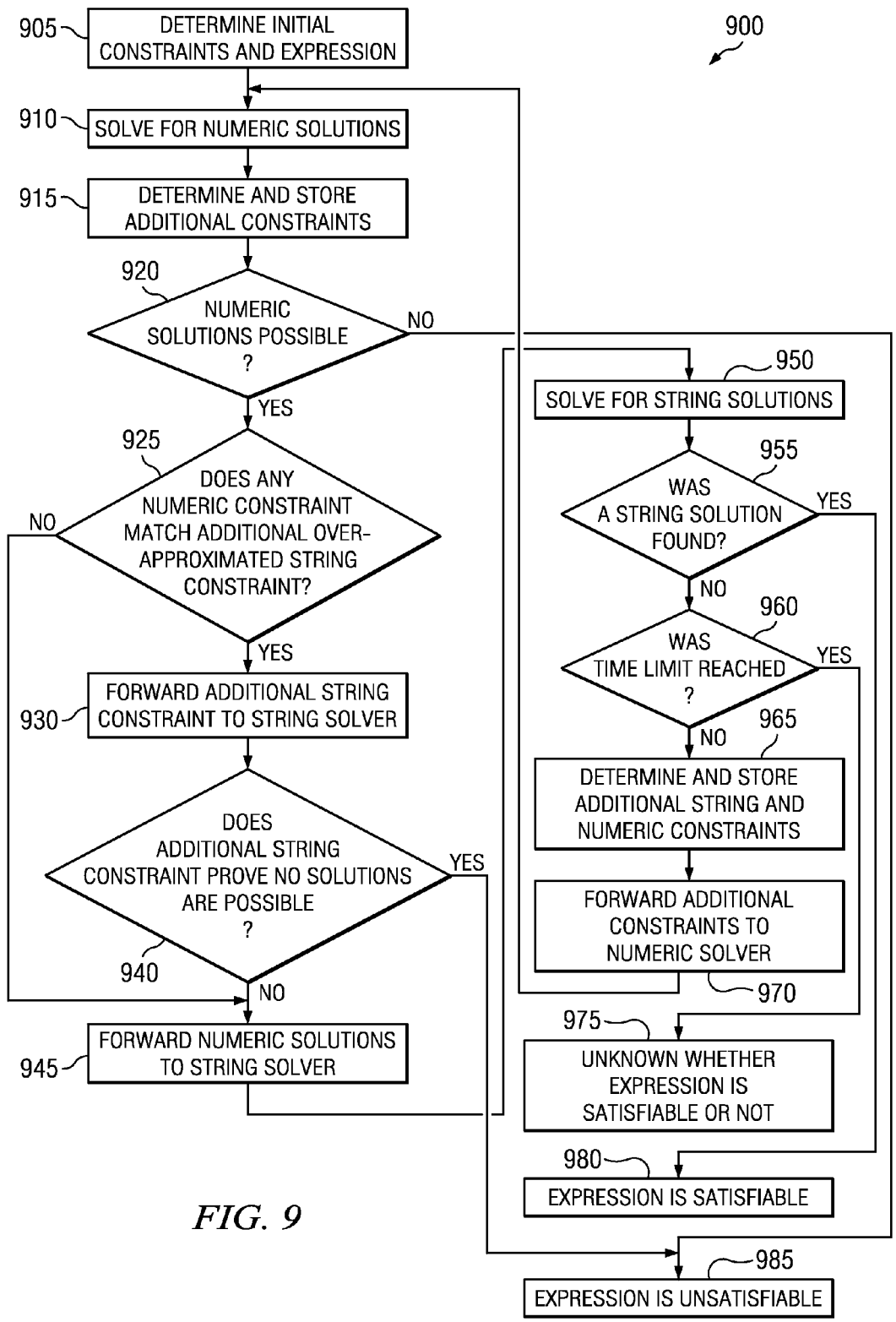
FIG. 9 is an illustration of an example embodiment of a method for rule-based solving of mixed numeric and string expressions.

FIG. 9 is an illustration of an example embodiment of a method 900 for rule-based solving of mixed numeric and string expressions. Method 900 may implement fully or in part step 835 of method 900.

In step 905, initial constraints and an expression to be evaluated may be determined. The constraints and expression may be received through, for example, symbolic execution. The constraints may represent conditions on the value of input, output, or internal variables. The expression may represent a set of formulas that must be solved using the constraints. If the expression and conditions can be solved, then the expression may be satisfiable. If the expression and conditions can be proven to be unsolvable, then the expression may be unsatisfiable. The expression may represent one or more operations of software. The expression may contain both numeric and string variables.

In step 910, numeric solutions for the expression given the numeric constraints may be determined, if possible. The numeric constraints may be expressed in a mathematical formula. Many possible solutions for the expression given the numeric constraints may be possible. One or more suitable solutions may be chosen. However, even though acceptable numeric solutions have been determined, it may not be known yet whether string solutions can be found. In step 915, additional constraints may be determined. Such constraints may include additional numeric constraints or string constraints. In one embodiment, additional string constraints may be determined by step 925.

In step 920, it may be determined whether numeric solutions were possible as determined in step 910. If not, then method 900 may proceed to step 985, where it may be determined that the expression is unsatisfiable. If so, then in step 925 it may be determined whether the numeric solution matches any additional string constraint. Such additional string constraints may include an over-approximated string constraint. The additional string constraint may include an operation on the numeric solution itself. The additional string constraint may be independent of the constraints provided by the symbolic execution. If there are no matching additional string constraints—in one embodiment, no a matching additional over-approximated string constraint—then method 900 may proceed to step 945. If there are any matching additional string constraints—in one embodiment, a matching additional over-approximated string constraint—then method 900 may proceed to step 930. In step 930, the additional string constraint may be forwarded to a string solver.

In step 940, it may be determined whether the additional string constraint, when evaluated in view of existing string constraints, proves that no solutions are possible. Step 940 may be conducted with a single iteration of a string solver, without multiple iterations of attempting to evaluate constraints in view of multiple sets of numeric solutions from a numeric solver. The evaluation of the additional string constraint in view of existing string constraints may be conducted through any suitable process. If no solutions are possible, then method 900 may proceed to step 985, where it may be determined that the expression is unsatisfiable. If in step 940 it cannot be determined that no solutions exist, then method 900 may proceed to step 945. If no additional string constraint was received, step 940 may have been skipped.

In step 945, the numeric solutions may be forwarded to the string solver. In step 950, solving for the string constraints and numeric solutions may be conducted. In one embodiment, if in step 945 it was determined that the additional string constraint did not yield a determination that the expression is unsatisfiable, then step 950 may be conducted ignoring the additional string constraint. In step 955, it may be determined whether a solution can be found that satisfies the string constraints and uses the received numeric solutions. If so, then a solution for both numeric and string values will have been shown, and thus method 900 may proceed to step 980, where it may be determined that the expression is satisfiable. If not, then, while a solution has not yet been found, a solution may yet be found with additional attempts. Such attempts may include, for example, continuing to search for strings that solve the constraints using the numeric solutions, or refining the numeric solutions and repeating the search for string solutions with the new numeric solutions. However, some searches may not have an end, wherein neither unsatisfiability nor satisfiability may be provable.

Thus, in step 960 it may be determined whether a time limit has been reached in the search for a solution for the expression. Although in method 900 a time limit is discussed, other thresholds, such as depth of execution, may be used to limit the execution of method 900. If the time limit has been reached, then method 900 may proceed to step 975 where it may be determined that is it unknown whether the expression is satisfiable or not.

If the time limit has not been reached, then in step 965 additional string and numeric constraints may be determined or inferred. In one embodiment, numeric constraints matching one or more string constraints may be determined. In step 970, the additional constraints and a notification that no solution has yet been found may be sent to the numeric solver. In one embodiment, method 900 may return to step 910 to repeat execution of steps for solving for numeric values. In another embodiment, method 900 may repeat execution at 950 to repeat solving for string solutions. In a further embodiment, method 900 may repeat execution at steps 910 and 950 in parallel. Method 900 may continue to repeat execution until it is determined whether the expression is satisfiable, unsatisfiable, or such status is unknown.

Although FIGS. 8 and 9 disclose a particular number of steps to be taken with respect to example methods 800 and 900, methods 800 and 900 may be executed with more or fewer steps than those depicted in FIGS. 8 and 9. In addition, although FIGS. 8 and 9 disclose a certain order of steps to be taken with respect to methods 800 and 900, the steps comprising methods 800 and 900 may be completed in any suitable order. Some portions of methods 800 or 900 may be successfully performed in the context of the other method.

Methods 800 and 900 may be implemented using the system of FIGS. 1-7 or any other system, network, or device operable to implement methods 800 and 900. In certain embodiments, methods 800 and 900 may be implemented partially or fully in software embodied in computer-readable media. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure.

What is claimed is:

1. A method comprising, by one or more computing devices:
   analyzing one or more first numeric constraints and one or more first string constraints associated with a software module comprising:
      one or more numeric variables, the first numeric constraints applying to specific ones of the numeric variables;
      one or more string variables, the first string constraints applying to specific ones of the string variables;
      one or more first operations that apply to specific ones of the numeric variables and produce numeric or string results; and
      one or more second operations that apply to specific ones of the string variables and produce numeric or string results;
   determining an over-approximated constraint from one or more of the first numeric constraints or first operations, the over-approximated constraint including a superset of the one or more of the first numeric constraints or first operations and applying to specific ones of the string variables, the superset including at least one criterion with a value not included in the first numeric constraints or first operations;
   representing the over-approximated constraint with a finite state machine;
   representing each one of the first numeric constraints with an equation;
   representing each one of the first string constraints with a finite state machine;
   determining whether a solution does not exist for the numeric and string variables that satisfies the over-approximated constraint, the first numeric constraints, and
the first string constraints using the first and second
operations; and terminating attempts to solve for the numeric and string
variables based on the determination whether the solution does not exist.

2. The method of claim 1, further comprising:
inferring one or more second numeric constraints applying to specific ones of the string variables;
inferring one or more second string constraints applying to specific ones of the numeric variables; and
based on the determination whether the solution does not exist, continuing to attempt to solve for the solution for the numeric and string variables, wherein the solution includes one or more values for specific ones of the numeric and string variables that satisfies all the numeric constraints and all string constraints using the first and second operations.

3. The method of claim 2, wherein continuing to attempt to solve for the solution includes ignoring the over-approximated constraint.

4. The method of claim 1, wherein:
the over-approximated constraint includes a superset of the one or more of the first string constraints or second operations; and
the over-approximated constraint is represented with an equation.

5. The method of claim 1, wherein determining the over-approximated constraint includes:
determining whether one of the first numeric constraints includes a criteria that a variable have a value; and
based on the value, determining whether the over-approximated constraint specify that a string representation of the variable require or forbid a negative-number-character in the left-most position.

6. The method of claim 1, wherein determining the over-approximated constraint includes:
removing the white space from a string representation of a numeric variable;
determining whether the resulting string representation has a length of zero; and
based on the determination of the length, setting the over-approximated constraint to specify that the string representation of the numeric variable is undefined.

7. The method of claim 1, wherein determining the over-approximated constraint includes:
determining that the value of a numeric variable must be greater than a positive integer; and
setting the over-approximated constraint to specify that the length of a string representation of the variable is greater than the log-base-ten of the positive integer and that the left-most character in the string representation of the variable is a negative-number-character.

8. The method of claim 1, wherein determining the over-approximated constraint includes:
determining that the value of a numeric variable must be less than a positive integer;
setting the over-approximated constraint to specify either a first rule or a second rule, wherein:
the first rule requires that the length of a string representation of the variable is less than or equal to the log-base-ten of the positive integer and that the left-most character in the string representation of the variable is not a negative-number-character; and
the second rule requires that the left-most-character in the string representation of the variable is a negative-number-character.

9. A system comprising:
a computer readable medium comprising computer-executable instructions; and
one or more processors coupled to the computer readable medium and operable to read and execute the instructions, the one or more processors being operable when executing the instructions to:
analyze one or more first numeric constraints and one or more first string constraints associated with a software module comprising:
one or more numeric variables, the first numeric constraints applying to specific ones of the numeric variables;
one or more string variables, the first string constraints applying to specific ones of the string variables;
one or more first operations that apply to specific ones of the numeric variables and produce numeric or string results; and
one or more second operations that apply to specific ones of the string variables and produce numeric or string results;
determine an over-approximated constraint from one or more of the first numeric constraints or first operations, the over-approximated constraint including a superset of the one or more of the first numeric constraints or first operations and applying to specific ones of the string variables, the superset including at least one criterion with a value not included in the first numeric constraints or first operations;
represent the over-approximated constraint with a finite state machine;
represent each one of the first numeric constraints with an equation;
represent each one of the first string constraints with a finite state machine;
determine whether a solution does not exist for the numeric and string variables that satisfies the over-approximated constraint, the first numeric constraints, and the first string constraints using the first and second operations; and
terminate attempts to solve for the numeric and string variables based on the determination whether the solution does not exist.

10. The system of claim 9, wherein the processors are further operable to:
infer one or more second numeric constraints applying to specific ones of the string variables;
infer one or more second string constraints applying to specific ones of the numeric variables; and
based on the determination whether the solution does not exist, continue to attempt to solve for the solution for the numeric and string variables, wherein the solution includes one or more values for specific ones of the numeric and string variables that satisfies all the numeric constraints and all string constraints using the first and second operations.

11. The system of claim 10, wherein continuing to attempt to solve for the solution includes ignoring the over-approximated constraint.

12. The system of claim 9, wherein:
the over-approximated constraint includes a superset of the one or more of the first string constraints or second operations; and
the over-approximated constraint is represented with an equation.

13. The system of claim 9, wherein determining the over-approximated constraint includes:
  determining whether one of the first numeric constraints includes a criteria that a variable have a value; and
  based on the value, determining whether the over-approximated constraint specify that a string representation of the variable require or forbid a negative-number-character in the left-most position.

14. The system of claim 9, wherein determining the over-approximated constraint includes:
  removing the white space from a string representation of a numeric variable;
  determining whether the resulting string representation has a length of zero; and
  based on the determination of the length, setting the over-approximated constraint to specify that the string representation of the numeric variable is undefined.

15. The system of claim 9, wherein determining the over-approximated constraint includes:
  determining that the value of a numeric variable must be greater than a positive integer; and
  setting the over-approximated constraint to specify that the length of a string representation of the variable is greater than the log-base-ten of the positive integer and that the left-most character in the string representation of the variable is a negative-number-character.

16. The system of claim 9, wherein determining the over-approximated constraint includes:
  determining that the value of a numeric variable must be less than a positive integer;
  setting the over-approximated constraint to specify either a first rule or a second rule, wherein:
    the first rule requires that the length of a string representation of the variable is less than or equal to the log-base-ten of the positive integer and that the left-most character in the string representation of the variable is not a negative-number-character; and
    the second rule requires that the left-most-character in the string representation of the variable is a negative-number-character.

17. An article of manufacture comprising:
  a computer readable medium; and
  computer-executable instructions carried on the computer readable medium, the instructions readable by a processor, the instructions, when read and executed, for causing the processor to:
  analyze one or more first numeric constraints and one or more first string constraints associated with a software module comprising:
    one or more numeric variables, the first numeric constraints applying to specific ones of the numeric variables;
    one or more string variables, the first string constraints applying to specific ones of the string variables;
    one or more first operations that apply to specific ones of the numeric variables and produce numeric or string results; and
    one or more second operations that apply to specific ones of the string variables and produce numeric or string results;
  determine an over-approximated constraint from one or more of the first numeric constraints or first operations, the over-approximated constraint including a superset of the one or more of the first numeric constraints or first operations and applying to specific ones of the string variables, the superset including at least one criterion with a value not included in the first numeric constraints or first operations;
  represent the over-approximated constraint with a finite state machine;
  represent each one of the first numeric constraints with an equation;
  represent each one of the first string constraints with a finite state machine;
  determine whether a solution does not exist for the numeric and string variables that satisfies the over-approximated constraint, the first numeric constraints, and the first string constraints using the first and second operations; and
  terminate attempts to solve for the numeric and string variables based on the determination whether the solution does not exist.

18. The article of claim 17, wherein the processor is further caused to:
  infer one or more second numeric constraints applying to specific ones of the string variables;
  infer one or more second string constraints applying to specific ones of the numeric variables; and
  based on the determination whether the solution does not exist, continue to attempt to solve for the solution for the numeric and string variables, wherein the solution includes one or more values for specific ones of the numeric and string variables that satisfies all the numeric constraints and all string constraints using the first and second operations.

19. The article of claim 18, wherein continuing to attempt to solve for the solution ignores the over-approximated constraint.

20. The article of claim 17, wherein:
  the over-approximated constraint includes a superset of the one or more of the first string constraints or second operations; and
  the over-approximated constraint is represented with an equation.

21. The system of claim 17, wherein determining the over-approximated constraint includes:
  determining whether one of the first numeric constraints includes a criteria that a variable have a value; and
  based on the value, determining whether the over-approximated constraint specify that a string representation of the variable require or forbid a negative-number-character in the left-most position.

* * * * *